United States Patent
Kawase et al.

(10) Patent No.: US 6,772,260 B2
(45) Date of Patent: Aug. 3, 2004

(54) DEVICE FOR AND METHOD OF GENERATING INTERRUPT SIGNALS

(75) Inventors: Yuji Kawase, Matsumoto (JP); Satoru Imai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 417 days.

(21) Appl. No.: 09/847,448

(22) Filed: May 2, 2001

(65) Prior Publication Data

US 2002/0002648 A1 Jan. 3, 2002

(30) Foreign Application Priority Data

May 29, 2000 (JP) .................................. 2000-158349
Apr. 5, 2001 (JP) .................................. 2001-107368

(51) Int. Cl.$^7$ .............................................. G06F 13/26
(52) U.S. Cl. ....................... 710/264; 710/265; 710/269
(58) Field of Search ........................... 710/14, 22, 23, 710/27, 28, 256, 263, 264, 265, 269; 358/468, 444; 399/1; 713/323, 322, 320, 321

(56) References Cited

U.S. PATENT DOCUMENTS

| | | | | |
|---|---|---|---|---|
| 4,972,312 A | * | 11/1990 | den Boef | ............... 710/269 |
| 5,146,595 A | * | 9/1992 | Fujiyama et al. | ............... 710/263 |
| 5,581,668 A | | 12/1996 | Oida et al. | |
| 5,708,819 A | * | 1/1998 | Dunnihoo | ............... 713/323 |
| 5,892,959 A | * | 4/1999 | Fung | ............... 713/323 |

FOREIGN PATENT DOCUMENTS

| | | |
|---|---|---|
| EP | 0 884 684 A1 | 12/1998 |
| JP | 5-32018 | 2/1993 |
| JP | 08-249081 | 9/1996 |
| WO | WO 99/34298 | 7/1999 |

* cited by examiner

*Primary Examiner*—Khanh Dang
(74) *Attorney, Agent, or Firm*—Rosalio Haro

(57) ABSTRACT

An interrupt signal generating device comprises interrupt detection units (20) each adapted to output a detection signal (DET-1 to DET-n) in response to a respective input signal (IN-1 to IN-n) representing an interrupt event; and an interrupt handler unit (15). The interrupt handler has a plurality of input terminals for receiving the detection signals (DET-1 to DET-n) and a plurality of output terminals for outputting corresponding interrupt signals to a CPU, and signal distribution means (16) connecting said input terminals to said output terminals and establishing a predetermined but changeable assignment between the input and output terminals, wherein each of said input terminals is assigned to one of said outputs terminals such that an interrupt signal (INT-1 to INT-n) is output from this output terminal in response to a detection signal (DET-1 to DET-n) applied to the respective input terminal.

20 Claims, 19 Drawing Sheets

INPUT SIGNALS 1 - n

| |
|---|
| LOW LINE INPUT VOLTAGE |
| HIGH LINE INPUT VOLTAGE |
| LOW INTERNAL VOLTAGE |
| HIGH INTERNAL VOLTAGE |
| DC MOTOR OVERCURRENT |
| RESET SIGNAL INPUT |
| INK CARTRIDGE OPEN |
| NO PAPER |
| COVER OPEN |
| NO INK |
| PAPER FEED BUTTON DEPRESSED |
| HOME POSITION SENSOR ACTIVATED |
| ⋮ |

FIG. 3

STATE REGISTER 71

| DETECTION SIGNAL | 1 | 2 | 3 | 4 | 5 | ------------- | n |
|---|---|---|---|---|---|---|---|
| FLAG | 0 | 0 | 1 | 0 | 0 | | 0 |

(a)

HISTORY REGISTER 72

| DETECTION SIGNAL | 1 | 2 | 3 | 4 | 5 | ------------- | n |
|---|---|---|---|---|---|---|---|
| FLAG | 0 | 0 | 1 | 0 | 0 | | 0 |

(b)

INTERRUPT MODE REGISTER 73

| INTERRUPT SIGNAL | INT-1 | INT-2 | INT-3 | INT-4 |
|---|---|---|---|---|
| FLAG | 1 | 0 | 0 | 0 |

(c)

STATE REGISTER 71

| DETECTION SIGNAL | 1 | 2 | 3 | 4 | 5 | ------------- | n |
|---|---|---|---|---|---|---|---|
| FLAG | 1 | 0 | 1 | 0 | 0 | | 0 |

DEVICE FOR AND METHOD OF GENERATING INTERRUPT SIGNALS

BACKGROUND OF THE INVENTION

1. Field of the Invention

The present invention relates generally to a device and method for generating interrupt signals to be applied to a CPU and for requesting an interrupt process. This invention relates more specifically to such a device and method for outputting a number of interrupt signals based on a plurality of interrupt events.

2. Description of the Related Art

Many recent electronic apparatuses have an energy-saving low power consumption mode (referred to as a "low power mode" below) that reduces power consumption by, for example, lowering the display brightness when the keyboard is not operated for a specific period of time, and/or by stopping power supply to an I/O device when there is no I/O access for a specific period of time. It will be noted that "low power mode" as used herein means a mode in which only some functions of the apparatus are enabled while others are disabled, i.e., power supply to and operation of the major part of the apparatus is temporarily stopped.

Furthermore, this low power mode generally shifts control to the normal operating mode when, for example, the keyboard is operated or an I/O access request is received, and power supply to the entire apparatus is restored.

JP-A-8-249081 and JP-A-5-32018, for example, teach a method for putting a high power consumption CPU into a sleep mode as a means of effectively reducing energy consumption. It should be noted that, in general, a CPU sleep mode is a state in which the CPU operating clock is stopped and signals applied to only some of the terminals, such as interrupt ports, can be detected (the CPU itself is not able to run any operating processes). A sleep mode is a low power mode advanced to the state where the CPU clock is stopped.

The above-noted prior art documents describe state transitions between modes, such as between a normal operating mode and a sleep mode. They are not clear, however, about how to control plural overlapping interrupt events and handling subsequent interrupt events while an interrupt process triggered by an earlier interrupt event is being executed. In addition to steadily increasing functional complexity, recent electronic apparatuses must also be able to set and handle a large number of interrupt events to, for example, effect state changes between a normal operating mode and a low power mode and between various low power modes including a sleep mode. There are even applications in which dozens of interrupt events must be handled.

When there are plural and particularly when there are dozens of interrupt events, controlling which interrupts to pass to the CPU under what conditions is an important factor relating to apparatus performance, that is, efficiently and appropriately operating the apparatus. A 1:1 relationship between interrupt events and interrupt signals is often not possible because the CPU has only a limited number of interrupt ports.

Depending upon the operating conditions, it may also be desirable to change the priority with which interrupt signals generated in response to particular interrupt events are processed by the CPU. For example, more efficient processing could be achieved in some cases by assigning a high priority to interrupt events unique to the sleep mode when the sleep mode is entered. It may also be useful to dynamically set or change the priority of processing interrupt events according to changes in the operating environment, such as changing interrupt event priority or disabling some interrupt events in response to an error state.

Under what specific conditions an interrupt will be generated, and what priority will be assigned to the interrupt, will vary according to the error or other cause of the interrupt and the frequency of the interrupt. If a problem occurs in the power supply, for example, it is necessary to immediately issue a specific warning and to take other measures as necessary, such as turning off the power supply. On the other hand, removing the ink tank from an ink jet printer or opening the cover when the printer's CPU is in a sleep mode are events of low urgency. In cases such as these the sleep mode can be maintained until an operating command is asserted, and the normal operating mode can be resumed when an interrupt event of greater importance occurs. It is thus preferable to be able to flexibly change interrupt signal priority.

Furthermore, when one interrupt is being handled and another interrupt request (of the same priority) is applied to the same interrupt port used for the interrupt being currently handled, the latter interrupt request may be ignored and an essential interrupt process will not be executed.

It is also possible to change interrupt event priority according to the operating mode of the apparatus (whether the CPU of the apparatus is in the sleep mode or other operating mode, for example). To accomplish this, however, it must be possible to change the interrupt priority in the mode transition process changing the operating mode. What events (changes in condition) cause the CPU to resume the normal operating mode will differ according to the basic design concept of the apparatus and what types of functions are provided in the apparatus. A high degree of freedom is therefore desirable for setting interrupt conditions.

A first object of this invention is to provide a device and method for generating interrupt signals that allow to statically or dynamically set the priority of interrupt signals generated in response to various interrupt events.

A further object of this invention is to provide such device and method capable of generating a number of interrupt signals from a larger number of interrupt events.

A yet further object of this invention is to provide such device and method whereby an appropriate handling process can be run when an interrupt event occurs while a previous interrupt of the same priority is being handled.

SUMMARY OF THE INVENTION

Embodiments of the present invention can change the priority of interrupt signals generated in response to plural event detection signals that represent interrupt events, can generate from the plural event detection signals a smaller number of interrupt signals, and, when an event detection signal is received during the execution of a current interrupt process, can perform another interrupt process appropriate to the received event detection signal after the current interrupt process ends, and thus resolves the above-described problems of the prior art.

It should be noted that interrupt signal priority as used herein corresponds to the number of interrupt ports available on a CPU such that if a CPU has four interrupt ports, for example, a maximum of four priority levels can be assigned to interrupt signals. It is normally possible to assign a priority level to each interrupt port of a CPU relative to its other interrupt ports. Embodiments of the present invention can set or change the priority level of interrupt signals generated from plural event detection signals according to the priority of the respective interrupt events, and re-assign interrupt signals to interrupt ports in the order of changing priority. In other words, these embodiments set the priority of interrupt signals generated from plural event detection signals, and can change interrupt signal priority.

Other objects and attainments together with a fuller understanding of the invention will become apparent and appreciated by referring to the following description of preferred embodiments taken in conjunction with the accompanying drawings, in which:

BRIEF DESCRIPTION OF THE DRAWINGS

FIG. 3 lists some events resulting in an interrupt signal causing the CPU to transit from a sleep mode to a normal operating mode.

FIG. 11 shows sample contents of a state register 71, history register 72, and interrupt mode register 73.

DESCRIPTION OF THE PREFERRED EMBODIMENTS

Despite the fact that embodiments of the invention are described below as applied to an ink jet printer, it will be understood that the invention can be applied to any electronic apparatus (simply called apparatus below) controlled by a CPU that handles interrupts resulting from a plurality of interrupt events.

Figure 2:
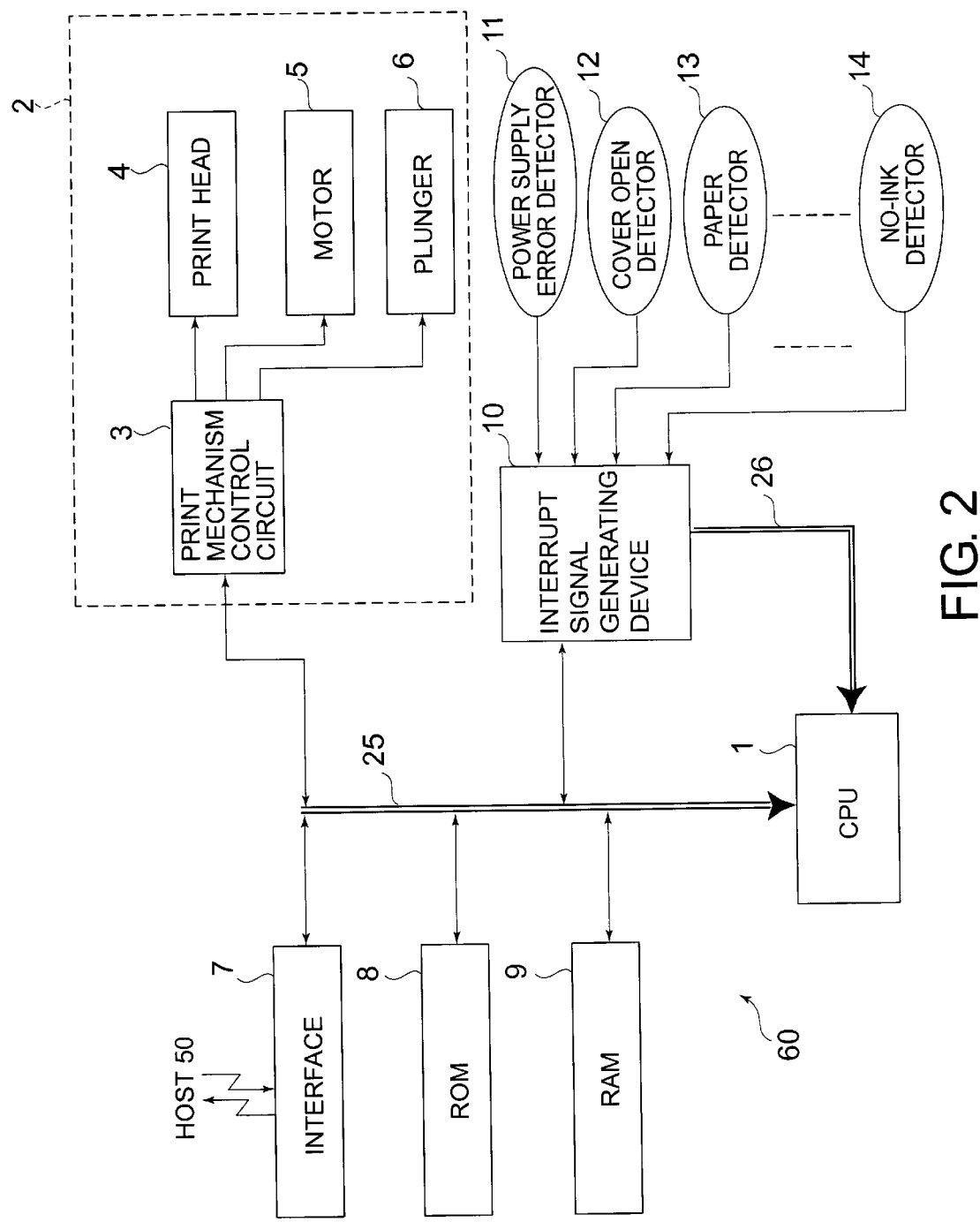
FIG. 2 shows the interrupt signal generating device applied to a printer.

The basic configuration of a printer having a interrupt signal generating device according to the present invention is described first with reference to the block diagram shown in FIG. 2. The CPU 1 shown in FIG. 2 has plural operating modes including a normal operating mode and a low power mode or sleep mode. A print mechanism 2, an interface 7, a ROM 8, and a RAM 9 are connected to the CPU 1 by way of a bus line 25. CPU control software (including firmware) and data are stored in ROM 8 and RAM 9. Under the control of this control software, CPU 1 controls the print mechanism 2 to print according to print data and print commands received from a host 50 by way of an interface 7. The print mechanism 2 comprises a control circuit 3 and, connected thereto, a print head 4, a motor 5, and a plunger 6. The control circuit 3 controls these other parts according to instructions from CPU 1.

An interrupt signal generating device 10 is further connected to CPU 1. Interrupt signal generating device 10 generates an interrupt signal in response to an error or other interrupt event, outputs the interrupt signal from interrupt signal output terminals to the interrupt ports of CPU 1 by way of an interrupt signal line 26, and is configured so that it can operate even when the CPU 1 is in the sleep mode. When an interrupt signal is input to an interrupt port of CPU 1 in the sleep mode, particular interrupt processes are executed to awaken the CPU 1 and bring it back to the normal operating mode.

The present invention relates to generating interrupt signals for CPU 1 and is unrelated to the operating modes, but the interrupt events include events that are related to the operating mode and events that are not related to the operating mode of the apparatus.

CPU 1 changes from a normal operating mode to a sleep mode as a means of reducing power consumption after no operations were performed for a specific period of time. The conditions in which a sleep mode is entered can be determined according to the type of apparatus and how it is used. Mode transitions are described in detail in the above-cited JP-A-5-32018, incorporated herein by reference. Because the present invention relates to interrupt signal generation, further description of the transition from one operating mode to another is omitted.

When an error or another specific change in operating conditions occurs during operation, the CPU 1 must perform an interrupt process to handle the change. When a problem with the power supply develops, for example, a specific alarm must be immediately issued and other actions, such as cutting off the power supply, taken as needed. When the ink tank is removed or the printer cover is opened, processes appropriate to these particular conditions must be performed. This is also the case when the CPU 1 is in the sleep mode, but then it is also necessary to first wake up the CPU 1 and return the CPU 1 to the normal operating mode.

What interrupt process is performed in response to particular changes in operating conditions, and whether the CPU is returned to the normal operating mode, depends on the basic design concept of the apparatus and what functions the apparatus has. It is therefore desirable that the interrupt events and interrupt event priority can be set and changed with a high degree of freedom.

In the printer shown in FIG. 2, signals from a power supply error detector 11, cover open detector 12, paper detector 13, and no-ink detector 14 are input to interrupt signal generating device 10. For example, if the ink tank is removed, it is necessary to issue an alarm indicating that the ink tank was removed, and to control the operation so that printing does not start even if a print command is detected. If a voltage surge or other power supply error occurs, the power supply must be immediately cut off or another measure taken so that other parts of the system are not damaged.

FIG. 3 shows some of the events in response to which an input signal is applied to the interrupt signal generating device 10 to cause an interrupt signal to be generated and applied to the CPU 1. When one of these events occurs while the CPU 1 is in the sleep mode, an interrupt signal must be generated to first trigger an interrupt process for waking the CPU 1 from the sleep mode to the normal operating mode, and then trigger the respective interrupt process to handle the specific interrupt event. When the same event occurs while the CPU 1 is in the normal operating mode, only the latter interrupt process needs to be triggered.

As shown in FIG. 3, such events typically include power supply problems and errors as detected by one of the various detectors or sensors. As also shown in FIG. 3, user operating instructions, such as pressing a paper feed switch are also interrupt events. It will be appreciated that in addition to the events shown in FIG. 3, there may be other and/or additional events, such as a time-out signal from a watchdog timer, that may require an interrupt process to be run in different CPU operating modes. Note that a watchdog timer is a timer for detecting a runaway condition of a CPU. When a CPU runaway condition occurs, an interrupt process stops the CPU and triggers another process, such as a reset process. Furthermore, as described below an interrupt signal could be generated, for example, to cause a change from the sleep mode to the normal operating mode as a result of the host outputting a wake-up command to the apparatus, the printer in this embodiment, being in a sleep mode.

Figure 1:
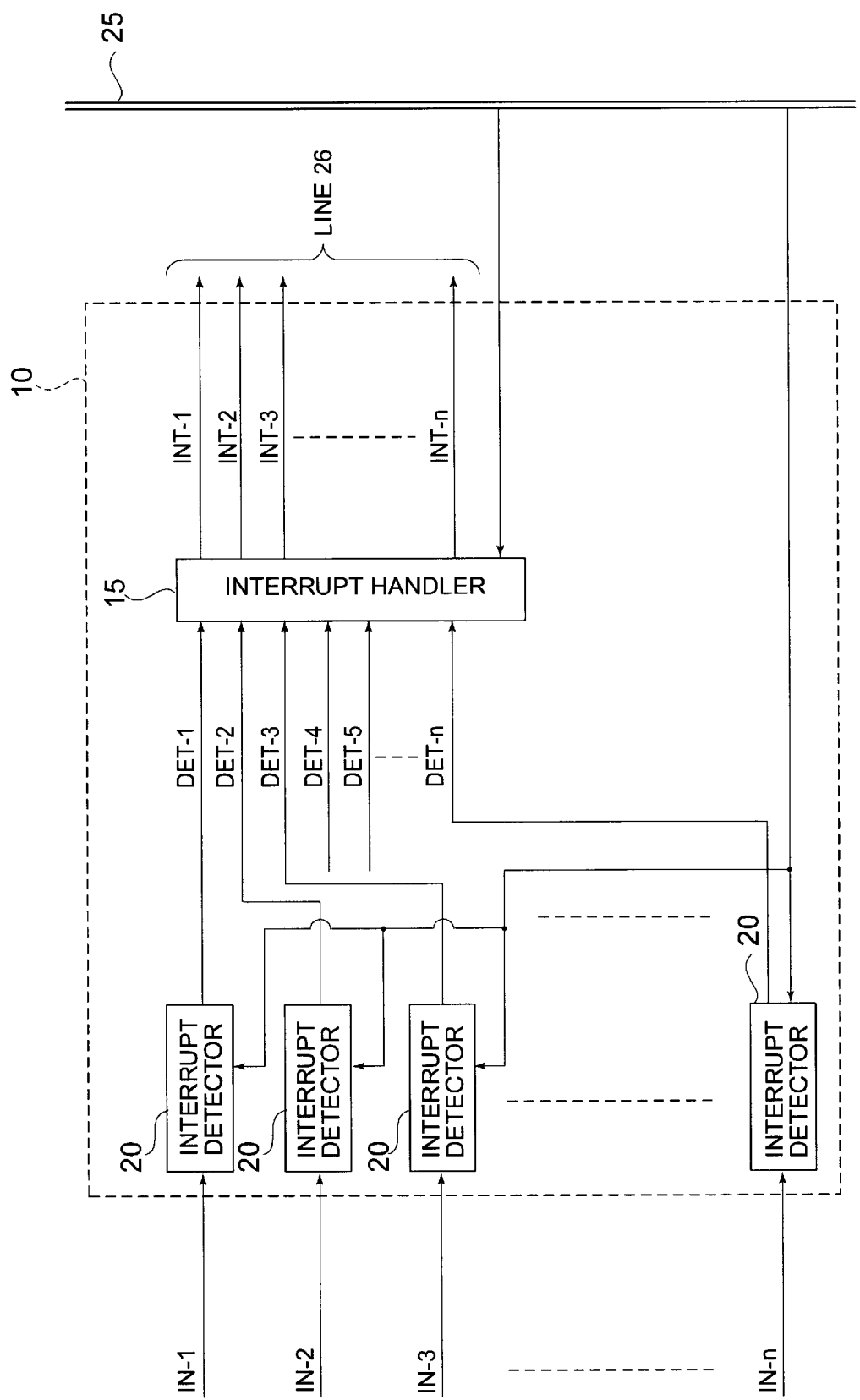
FIG. 1 shows an embodiment of an interrupt signal generating device according to the present invention.

A first embodiment of the interrupt signal generating device 10 according to the present invention is described below with reference to FIG. 1. Input signals IN (IN-1 to IN-n) from the sensors or detectors (such as detectors 11 to 14 in FIG. 2) are input to corresponding interrupt detectors 20 of the interrupt signal generating device 10. The interrupt detectors 20 can be configured to output a detection signal DET (DET-1 to DET-n) unconditionally whenever an input signal IN is received, or only when the respective input signal IN satisfies specific conditions.

The detection signals are output to an interrupt handler 15. Following predefined conditions, interrupt handler 15 outputs a received detection signal as an interrupt signal INT (INT-1 to INT-n) of a specific priority. The interrupt handler is designed such that the priority of an interrupt signal corresponding to a particular input signal can be arbitrarily set irrespective of which of input signals IN-1 to IN-n is applied to which of the interrupt detectors 20 and the physical connections between interrupt detectors 20 and interrupt handler 15.

The interrupt signals INT-1 to INT-n are applied via interrupt signal line 26 to the interrupt ports of CPU 1. Priority is determined by CPU 1 for each interrupt port, and interrupt processes are run according to the port priority. It is therefore possible to select and change the priority with which a certain interrupt signal is processed by selecting or changing the interrupt port of the CPU 1 to which that interrupt signal is applied. The interrupt handler 15 and interrupt detectors 20 receive control data from CPU 1 by way of bus line 25, and can be configured to detect interrupt events and set or change interrupt signal priority based on the received control data.

Figure 4:
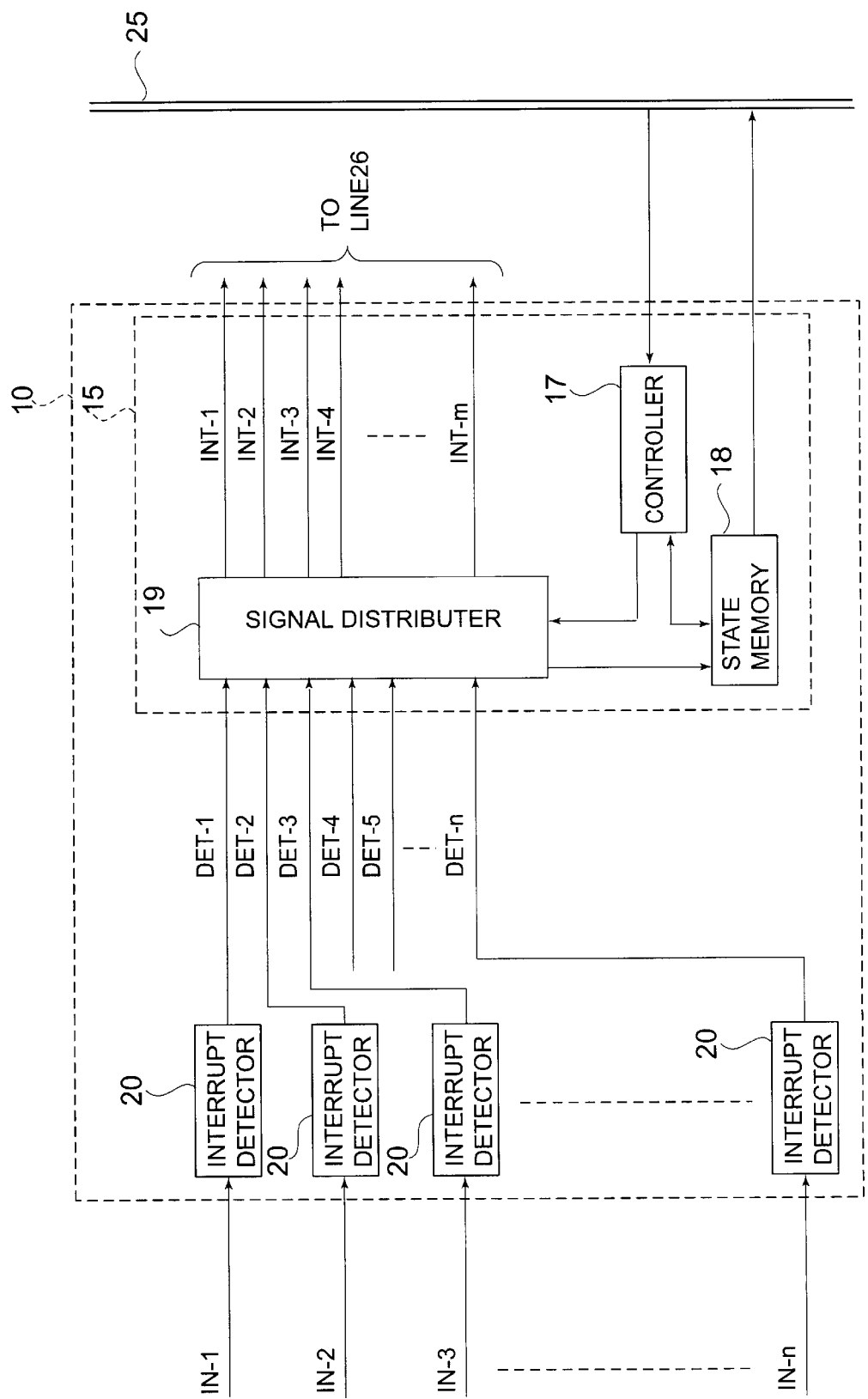
FIG. 4 shows a first embodiment of the interrupt handler in the interrupt signal generating device.

FIG. 4 shows a first embodiment of the interrupt handler 15. The interrupt handler 15 of this embodiment comprises a controller 17, a state memory 18, and a signal distributer 19. Detection signals DET-1 to DET-n are input to the signal distributer 19. The signal distributer 19 may be any device having a plurality of input and output terminals that allows switching the assignment between the input and output terminals. The signal distributer 19 functions as a priority setting/changing unit.

Figure 5:
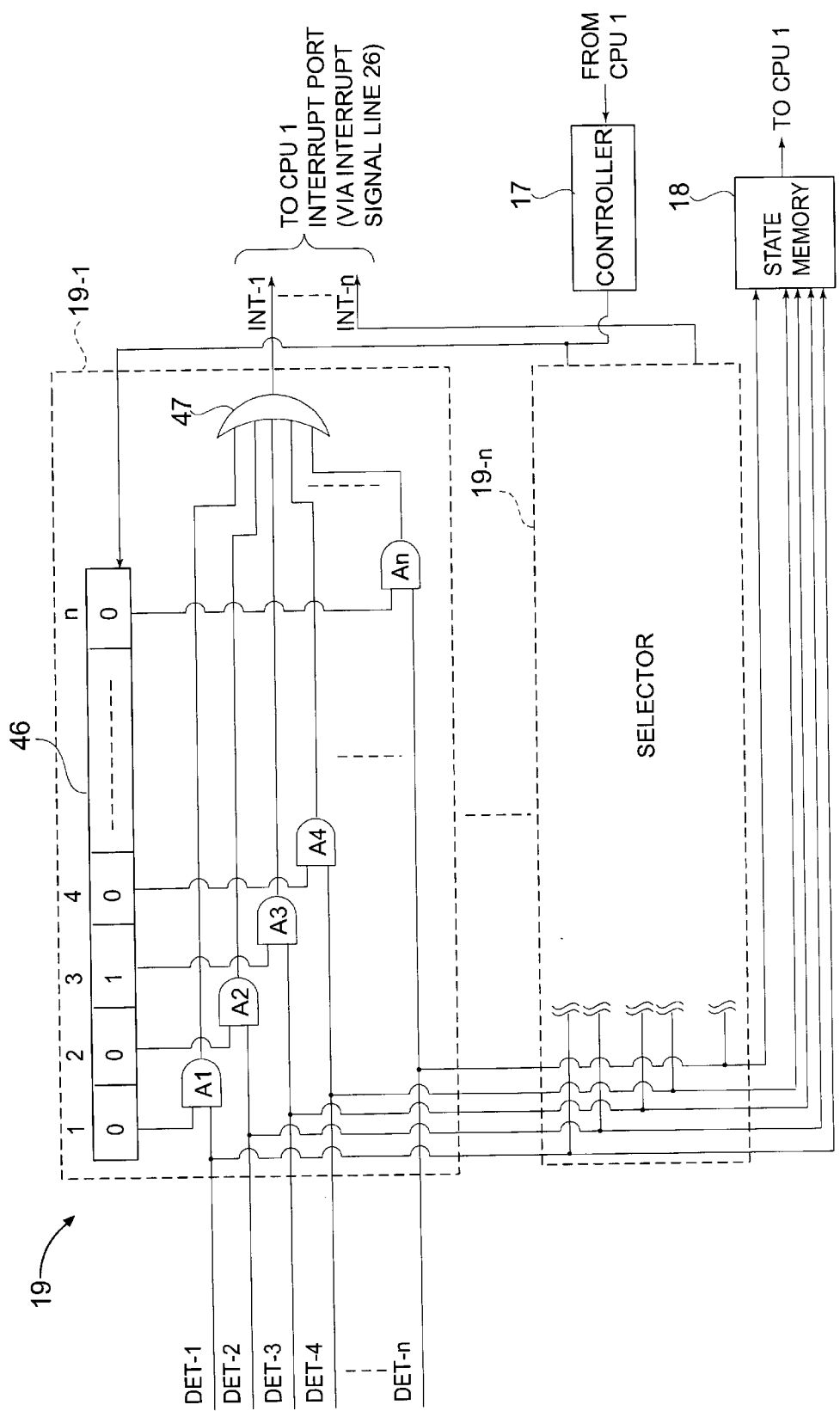
FIG. 5 shows an example of the signal distributer for changing interrupt priority in the interrupt handler of FIG. 4.

An example of the signal distributer 19 is shown in FIG. 5. The signal distributer 19 comprises n selectors 19-1 to 19-n. Only the first selector 19-1 is shown in detail and will be explained below because all selectors 19-1 to 19-n are identical in structure and function. All detection signals DET-1 to DET-n are applied to all selectors 19-1 to 19-n in parallel.

Selector 19-1 has an n-stage selection register 46. Each stage holds one bit, i.e., there is one bit for each of the n detection signals DET-1 to DET-n. The outputs of the n stages of selection register 46 are applied to first inputs of AND gates A1 to An, respectively. The detection signals are applied to respective second inputs of the AND gates. In the example shown, the output of the first stage of selection register 46 and detection signal DET-1 are applied to AND gate A1, the output signal of the second stage of selection register 46 and detection signal DET-2 are applied to AND gate A2, etc. The outputs of AND gates A1 to An are applied to respective inputs of an OR gate 47 providing the output signal of selector 19-1, i.e., the interrupt signal INT-1. Although not shown in the drawings, a signal formatter may follow the signal distributer as an output stage of the interrupt signal generating device 10, as needed, to ensure a desired format, such as pulse width, of the interrupt signals. This applies to all embodiments described in this text.

If the value of the bit in one of the n stages of selection register 46 is 1 and that of all other stages is 0, only the AND gate corresponding to the 1 bit is enabled while all other AND gates are disabled. A 1:1 correlation between input detection signals and output interrupt signals can be achieved by setting the bits in the n selection registers of selectors 19-1 to 19-n so that in each selector a different one of the n AND gates is enabled and all other AND gates are disabled. It will be appreciated that by shifting the respective 1 bit in all selection registers 46 to another stage such setting can be easily changed while keeping the 1:1 assignment. This allows to select and change for each input signal the interrupt port to which the corresponding interrupt signal is applied (within the 1:1 assignment constraint). Since different priorities are assigned to different interrupt ports, this allows selecting (and changing) the priority of an interrupt signal corresponding to a respective detection signal.

In the example shown in FIG. 5, only the bit in the third stage of selection register 46 is set to 1 in selector 19-1. AND gate A3 is, therefore, enabled and OR gate 47 outputs 1 only when detection signal DET-3 is input. A signal is therefore output from the first output terminal of signal distributer 19 in response to detection signal DET-3. The output signal from the first output terminal is applied as interrupt signal INT-1 to the first interrupt port of CPU 1 which is here assumed to have the highest priority among all interrupt ports.

Hence, the assignment between input terminals (or input signals) and output terminals (or output signals) of interrupt handler 15 can be set by pre-setting certain binary values (words), each including one 1 digit and (n-1) 0 digits, in the selection registers 46 with all these values differing from one another. The selection registers can preferably be externally pre-set or changed. FIG. 4 shows a configuration in which control is provided by controller 17. A particular control signal is sent to controller 17 from CPU 1 or an input device such as an operating panel to set or change the values in the selection registers 46. It should be noted that CPU 1 can control state memory 18 and signal distributer 19 by way of controller 17 by sending appropriate control data to controller 17 via bus line 25.

State memory 18 stores information that identifies the detection signal DET when any is received by interrupt handler 15. The CPU 1 can confirm the interrupt event that caused an interrupt signal during an interrupt process by reading the content of state memory 18, and can thus run the interrupt process appropriate to that interrupt event.

Figure 6:
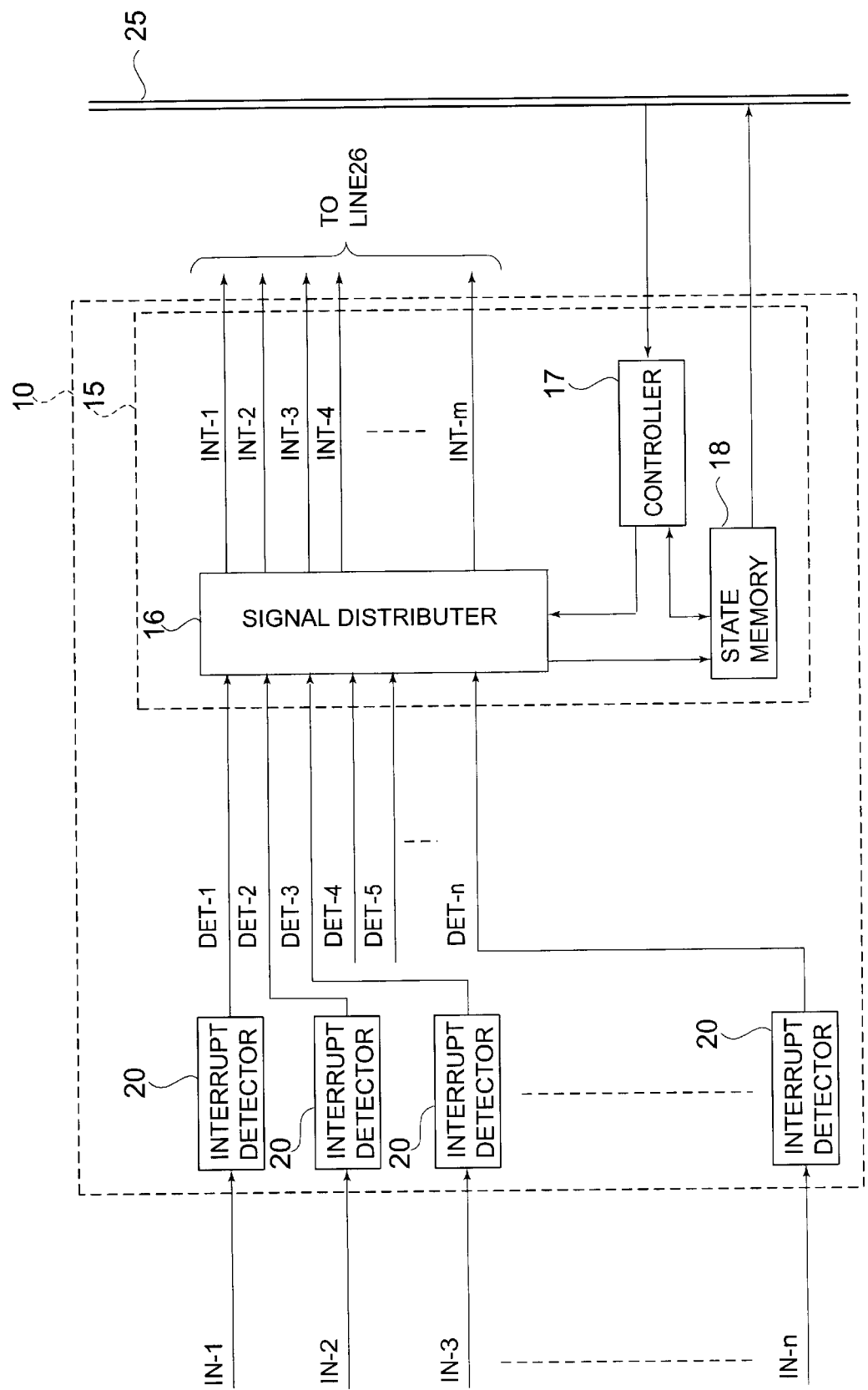
FIG. 6 shows a second embodiment of the interrupt handler.

A second embodiment of the interrupt handler 15 is described next with reference to FIG. 6. The interrupt handler 15 of this embodiment comprises a different signal distributer 16, a controller 17, and a state memory 18. The controller 17 and state memory 18 are identical to those of the first embodiment in FIG. 4, and only signal distributer 16 is therefore described below.

As described above, signal distributer 19 distributes n detection signals DET-1 to DET-n to n interrupt signals INT-1 to INT-n with a unique relationship between the detection and interrupt signals. By contrast, signal distributer 16 distributes n detection signals DET-1 to DET-n to m interrupt signals INT-1 to INT-m with m<n. In other words, signal distributer 16 groups some or all of the n detection signals DET-1 to DET-n according to specific conditions into m interrupt groups and provides one interrupt signal for each group. Referring to only the signal distributer, its function can be defined as grouping some or all of its n input terminals into m groups and to assign each group to one of its m output terminals, a different one for each group. The conditions on which the signals (or input terminals) are grouped are controlled by controller 17. As described above, controller 17 can be controlled by CPU 1 using bus line 25. The CPU normally has eight interrupt ports, but there can be more than forty input signals (and thus detection signals) that represent interrupt events. An appropriate interrupt process can be run even when there are numerous detection signals by appropriately grouping the detection signals and assigning interrupt signal priority by interrupt group.

Figure 7:
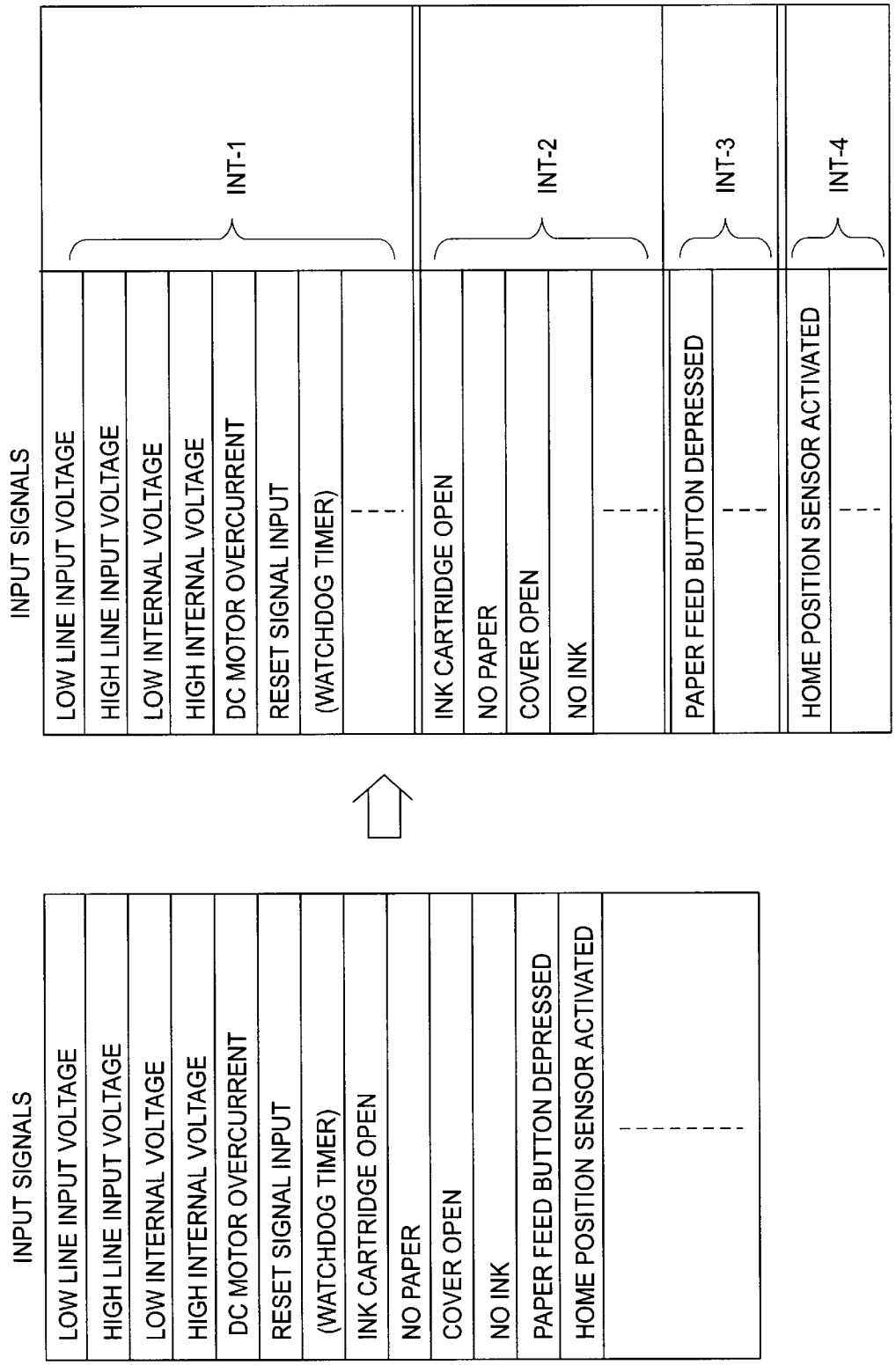
FIG. 7 shows an exemplary grouping of input signals into interrupt groups.

FIG. 7 shows an exemplary method of grouping plural detection signals. In this example the priority of the interrupt processes performed by the CPU decreases in a reciprocal relation to the number 1 to m of the interrupt signals. A power supply error, for example, could result in equipment damage and disable normal operation, and is therefore normally handled by an interrupt process having the highest priority. In the example shown in FIG. 7, power supply errors, reset instructions, and watchdog timer input are assigned the highest priority. It should be noted that while the watchdog timer signal is treated as a high priority signal in FIG. 7, a CPU runaway cannot occur in the sleep mode. The sleep mode transition process can therefore be designed to the change interrupt signal priority so that, e.g., the priority of the watchdog signal is lowered in the sleep mode, to that of INT-4, for instance.

It will thus be understood that the present invention allows setting and changing the interrupt signal priority statically, i.e., not dependent on any operating mode, but also dynamically, namely in response to a change in operating mode.

The second highest priority is assigned to conditions that will cause a problem with printing, such as no ink cartridge, an open ink cartridge, or no paper.

Next-highest priority is assigned to such events as the operator pressing the paper feed button, and home position detection by a sensor. It will be obvious that the priority assigned to specific events will vary according to the design concept of the a particular apparatus. Furthermore, while events are grouped into four interrupt groups in this example, the specific number of interrupt groups will be determined according to need or the number of interrupt ports on the CPU 1.

Figure 8:
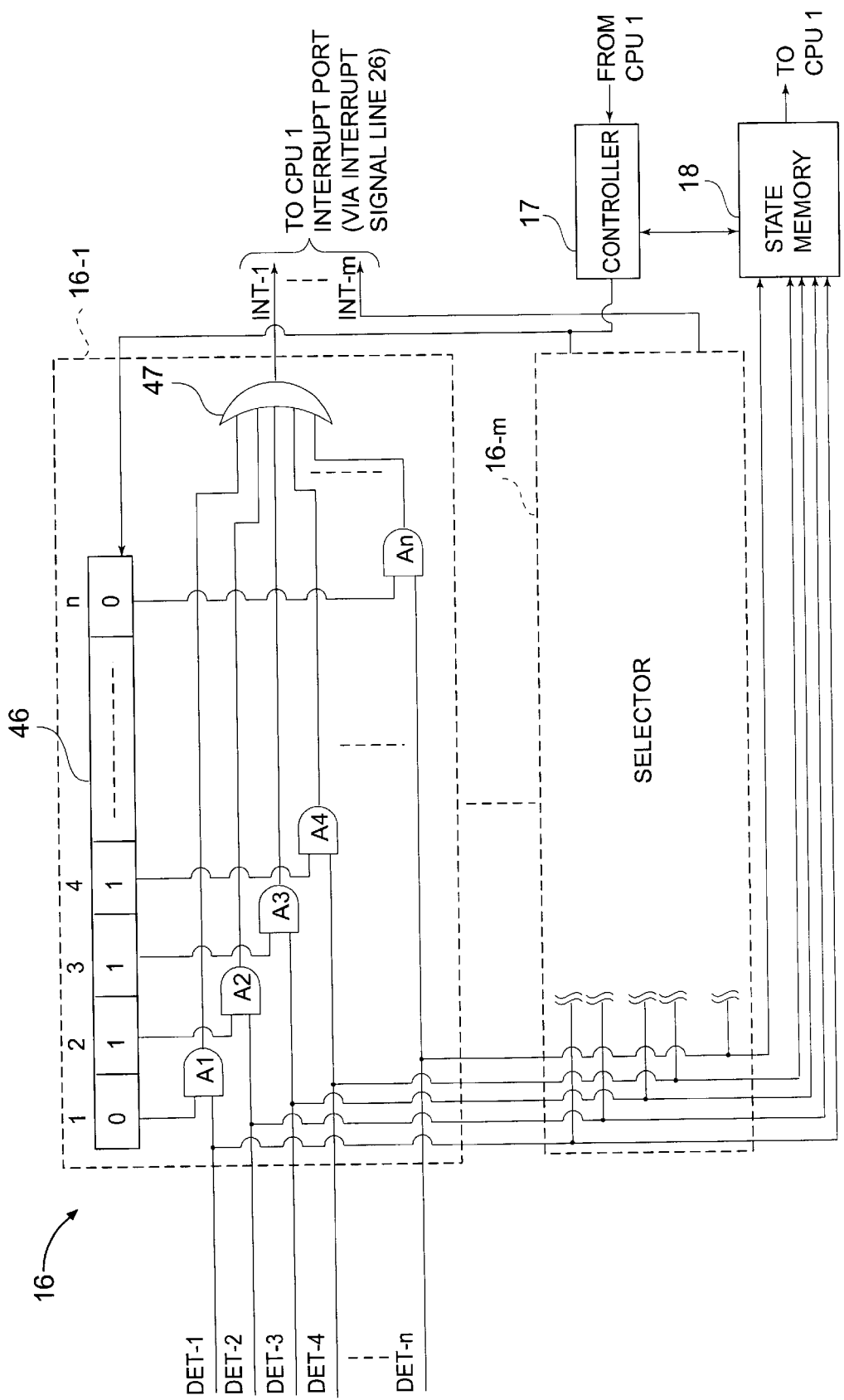
FIG. 8 shows an example of the signal distributer for grouping and changing interrupt priority in the interrupt handler of FIG. 6.

FIG. 8 shows an exemplary configuration of signal distributer 16. In this example, signal distributer 16 comprises m selectors 16-1 to 16-m as opposed to n selectors in signal distributer 19. Selectors 16-1 to 16-m shown in FIG. 8 are substantially the same as selectors 19-1 to 19-n in FIG. 5. Only the binary values set in selection registers 46 are different in that, in signal distributer 16, the selection register of one or more selectors holds a binary value with more than one 1 digit. In order to obtain in interrupt signal in response to each of the n detection signals, there must be a total of n 1 bits in all selection registers together. How these n 1 bits are distributed among the individual selection registers depends on how the n detection signals are to grouped into those m interrupt groups or, in other words, which detection signals are included in which interrupt group is determined by presetting respective values in the selection registers 46.

For example, bits 2, 3, and 4 are set to 1 in selection register 46 of first selector 16-1 shown in FIG. 8. AND gates A2, A3, and A4 are therefore enabled, and OR gate 47 outputs 1 when any one of detection signals DET-2, DET-3, and DET-4 is input. As a result, interrupt signal INT-1 is output by first selector 16-1 when any one of three detection signals DET-2 to DET-4 is applied.

Setting the selection registers 46 can be controlled by the controller 17 as described above with reference to FIG. 4. As also noted above, controller 17 can be controlled by the CPU by way of bus line 25. Setting the selection registers 46 can therefore also be controlled by CPU 1 or by an external operating panel, for example.

Figure 9:
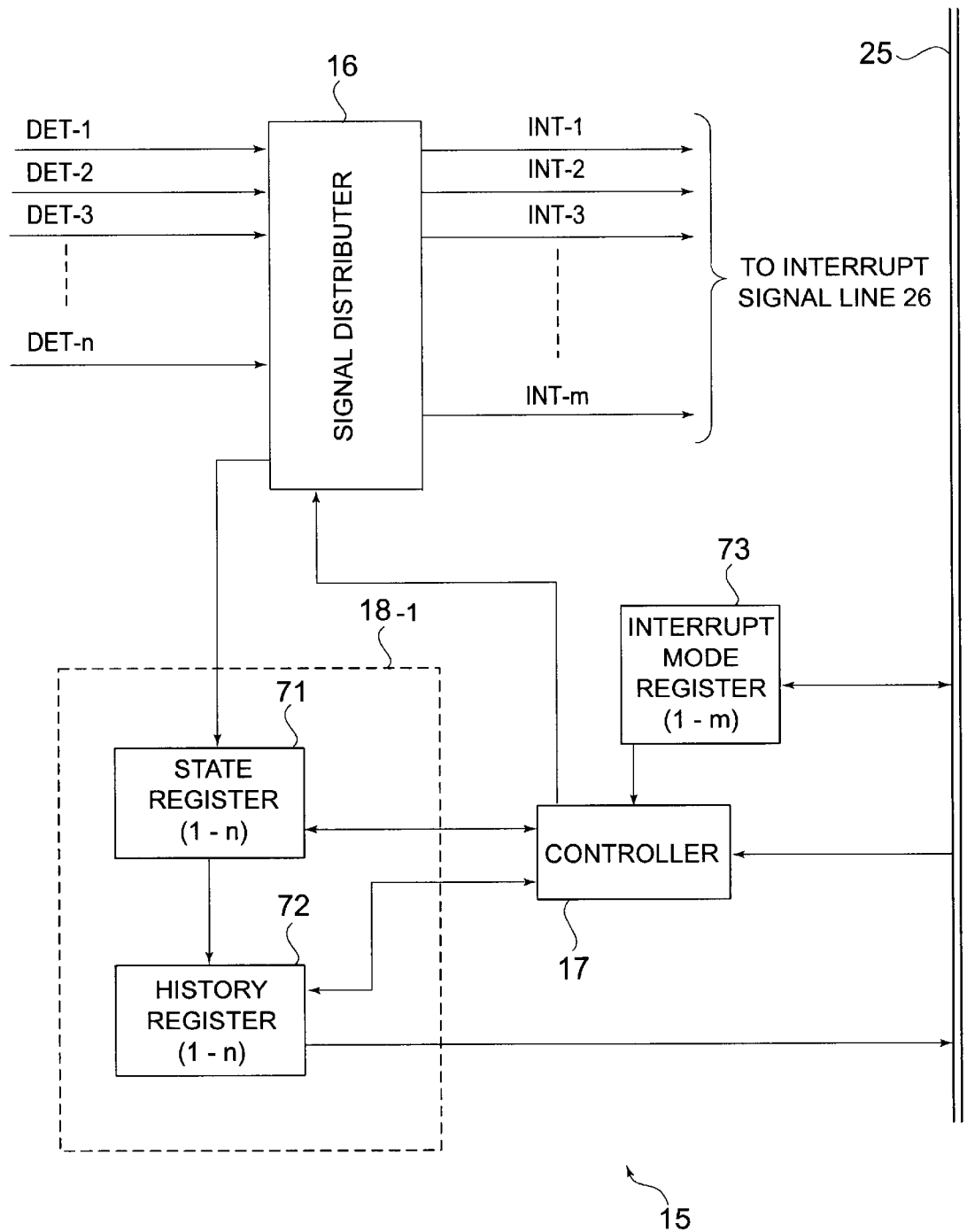
FIG. 9 is a function block diagram showing a modification of the interrupt handler in FIG. 6.

A process for handling further detection signals that may be received while an interrupt process, triggered by a previous detection signal of the same interrupt group, is being executed, is described next with reference to FIG. 9. FIG. 9 is a function block diagram showing a third embodiment of interrupt handler 15 which is a modification of the second embodiment. In addition to the signal distributer 16, controller 17 and state memory 18 of the second embodiment, the interrupt handler 15 of this third embodiment includes an interrupt mode register 73.

State memory 18-1 in this embodiment has a state register 71 and a history register 72. The state register 71 stores the fact that a certain detection signal has been received and information identifying each received detection signal. State register 71 and history register 72 may each be an n-bit register, for instance, having a respective bit (flag) for each of the n detection signals. The contents of history register 72 is the same as that of state register 71 as longs as the CPU 1 is in its normal operating mode, and can be read by the CPU by way of bus line 25 when the CPU starts running an interrupt routine. When an interrupt routine is triggered in any of the m interrupt groups, CPU 1 sets a corresponding mode flag in mode register 73 indicating that an interrupt mode was entered. This is done separately for each of the m interrupt groups, i.e., mode register 73 holds m such mode flags.

When an interrupt occurs, the CPU sets that mode flag in mode register 73 that is assigned to the interrupt group having triggered the interrupt (for easier reference the interrupt group having triggered a running interrupt routine will be assumed to be the first interrupt group). Because interrupt modes are managed separately for each interrupt group, the remaining mode flags remain unchanged and there is no effect on the other interrupt groups. When the mode flag in mode register 73 corresponding to the first interrupt group is in the set state, state register 71 and history register 72 are controlled by controller 17 as follows.

When a detection signal assigned to a different interrupt (suppose: the second) group is received, the state register 71 is updated and the change is copied to history register 72 as in the normal operating mode (assuming that the mode flag for the second interrupt group is in the reset state). On the other hand, when a detection signal assigned to the same interrupt group (the first interrupt group) is received, the state register 71 is updated but this change is not copied to history register 72. The contents of state register 71 and the contents of history register 72 thus differ.

When the interrupt routine ends and CPU 1 resets the mode flag it had set before, and controller 17 is caused to compare the contents of state register 71 with that of history register 72. If the contents differ, a control signal is output from controller 17 to signal distributer 16, and a corresponding interrupt signal is sent from signal distributer 16. Another interrupt routine is thus performed and the same procedure is repeated. Because a separate flag is kept for each detection signal in state register 71 and history register 72, controller 17 knows which detection signal has been kept waiting, when there is a mismatch between the two registers.

Figure 10:
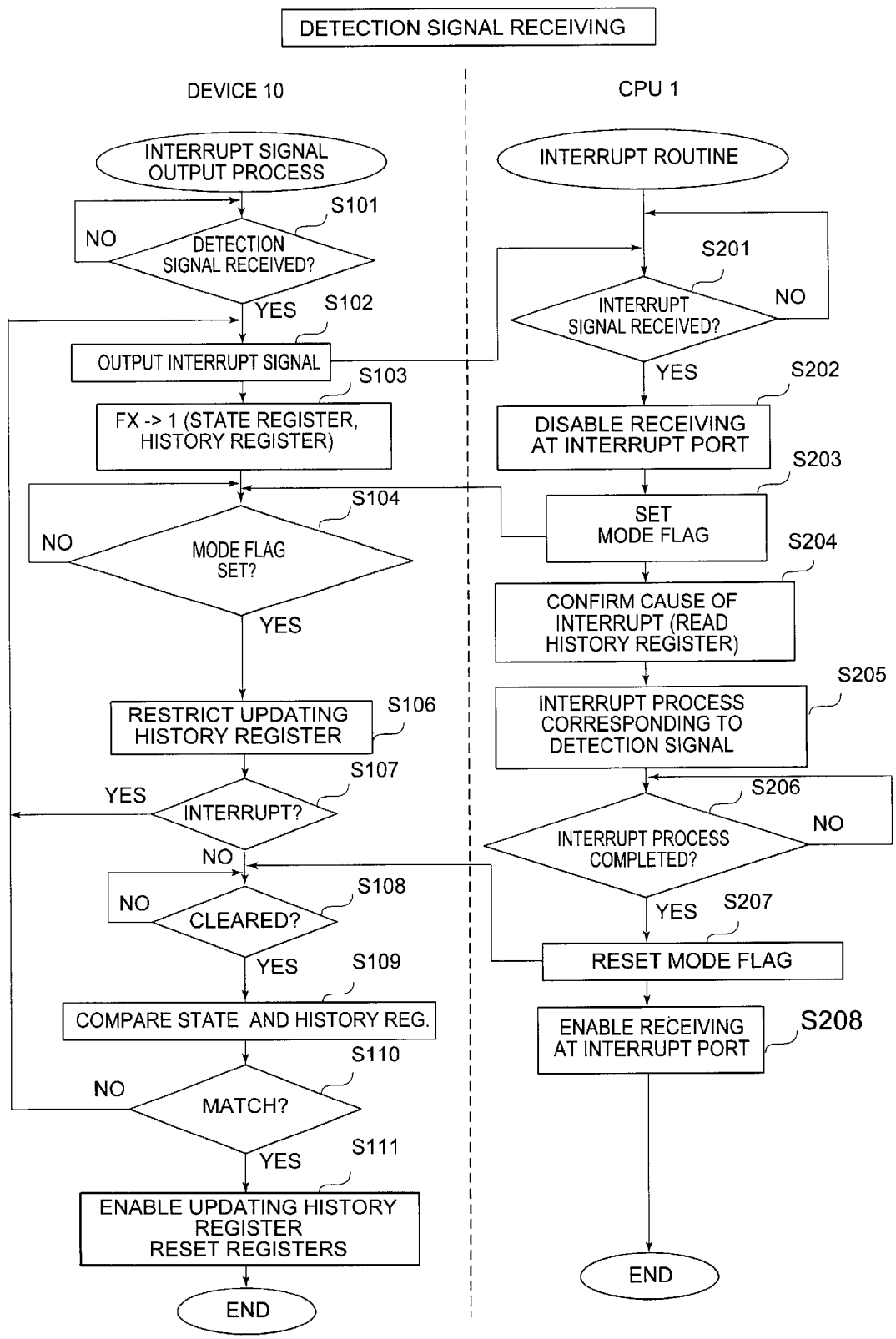
FIG. 10 is a flow chart of an interrupt signal output process and a CPU interrupt routine in an interrupt signal generating device according to FIG. 9.

FIG. 10 is a flow chart of the interrupt signal output process of this interrupt signal generating device and the interrupt routine of the CPU. FIG. 11 shows settings stored in state register 71, history register 72, and mode register 73 by way of example. Interrupt signal output and CPU operation are described next below with reference to the flow chart in FIG. 10 and FIG. 11. Note that for simplicity only four interrupt signals corresponding to four interrupt groups are used in the following explanation.

First, when a detection signal DET is received (S101 returns Yes), an interrupt signal INT is output (S102), the corresponding bit Fx (x=1, . . . , n) in state register 71 is set to 1, and this change in state register 71 is copied to history register 72. If detection signal DET-3, for example, is received in this step, bit 3 is set to 1 in both state register 71 and history register 72 as shown in FIGS. 11(*a*) and (*b*). Interrupt signal INT-1 is output to the CPU because detection signal DET-3 belongs to the first interrupt group assigned to interrupt signal INT-1 as shown in FIG. 11.

When it receives the interrupt signal (S201 returns Yes), the CPU disables the interrupt port involved (port 1) and, thereby, prohibits receiving subsequent interrupt signals (S202). It then sets the respective mode flag 1 (mode flag 1, the mode flag assigned to the first interrupt group, in this example) in the mode register 73 of that interrupt signal generating device 10 that sent the interrupt signal (S203), reads the contents of history register 72 (S204) to confirm the interrupt event, and runs the corresponding interrupt process (S205, S206).

The interrupt signal generating device 10 monitors the mode register 73. When it detects that mode flag 1 in mode register 73 is set to 1 as shown in FIG. 11 (*c*) (S104), controller 17 restricts updating of the history register 72, i.e., it does not copy any further change in bits 1 to 5 in state register 71 to the history register 72 (S106). That is, even if any of detection signals DET-1 to DET-5 associated with the same (i.e., the first in this example) interrupt group is received, the corresponding update in bits 1 to 5 is not copied to history register 72.

If another detection signal is received during an interrupt routine (S107 returns Yes), and the detection signal belongs to an interrupt group other than the first interrupt group, steps S102 to S107 and CPU steps S201 to S206 are repeated. If the detection signals belongs to the same, i.e. the first, interrupt group, only steps S102 to S107 are repeated. In this latter case however, because an interrupt routine is already in progress, only state register 71 is updated whereas updating of history register 72 is restricted. Therefore, assuming for example that detection signal DET-1 is received, bits 1 and 3 in state register 71 are set to 1 as shown in FIG. 11 (*d*), but history register 72 remains with only bit 3 set to 1 as shown in FIG. 11 (*b*). In this latter case, interrupt signal INT-1 is output to the CPU in step S102, but it has no effect because the CPU's interrupt port 1 is disabled. This is because running two interrupt routines of the same level at the same time would require a complex control. It should be noted, however, that whereas the flow chart in FIG. 10 describes a configuration that outputs another interrupt signal of the same number even when the same detection signal is again generated during an interrupt routine, it is also possible to have the configuration so that such repeated output of the same interrupt signal while the interrupt routine triggered by the first occurrence of that interrupt signal is still being executed, is prevented. This is described further below.

When the CPU interrupt process ends (S206 returns Yes), the CPU clears the interrupt mode, i.e., it resets mode flag 1 in our example (S207), enables the interrupt port (port 1) (S208), and ends the interrupt routine.

When controller 17 in the interrupt signal generating device 10 notices that the mode flag is reset, it compares the contents of state register 71 with that of history register 72 (S109). If the contents are the same (S110 returns Yes), registers 71 and 72 are reset or only state register 71 is reset, the update restriction of history register 72 is canceled and the process ends. Note that this reset of registers 71 and 72 or only register 71 concerns only the bits assigned to the interrupt group that triggered the interrupt process that was completed in step S206. Note further that resetting of only register 71 would be sufficient because the update of history register 72 in response to the next detection signal from the same interrupt group will harmonize the bit values of both registers corresponding to that interrupt group Because detection signal DET-1 is received during the interrupt routine in this example, the contents of state register 71 and that of history register 72 differ as shown in FIGS. 11 (*b*) and (*d*) and step S110 thus returns No. When S110 returns No, control loops back to step S102, interrupt signal INT-1 corresponding to detection signal DET-1 is output, and the process described above (steps S102 to S111) is repeated. The CPU can perform the appropriate interrupt process (steps S201 to S208) because the interrupt port 1 has been enabled again as described above.

Figure 12:
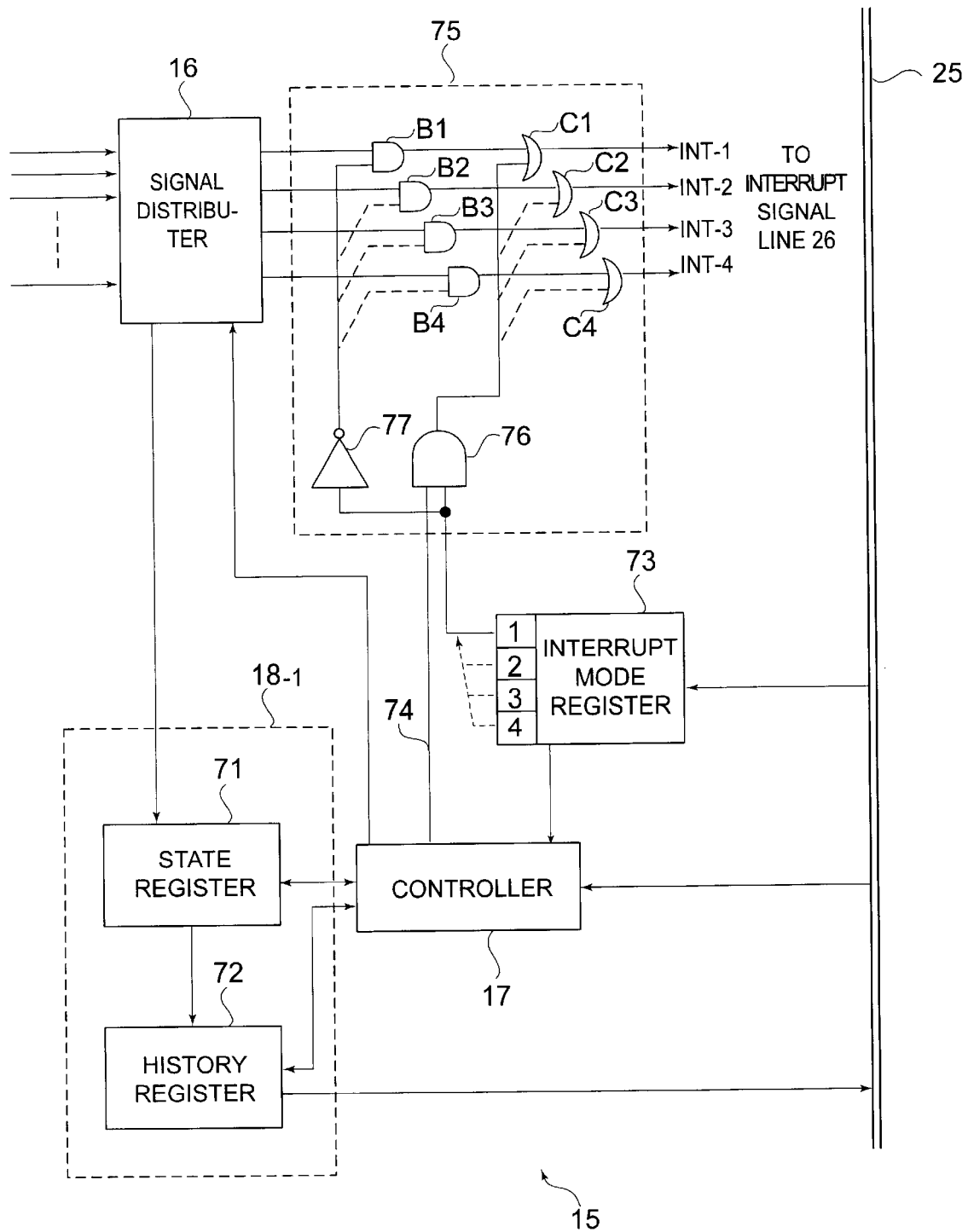
FIG. 12 is a function block diagram showing a further embodiment of the interrupt handler.

FIG. 12 is a function block diagram of a fourth embodiment of the interrupt handler 15. This embodiment is adapted to block repeated interrupt signals of the same interrupt group during an interrupt routine triggered by a previous interrupt signal from that interrupt group. To achieve this additional function, an interrupt output controller 75 is added to the signal distributer 16. Although interrupt output controller 75 is shown external to the signal distributer 16 in the configuration shown in FIG. 12 for easier understanding of the configuration of the controller 75 it may in fact be part of the signal distributer 16. The example shown in FIG. 12 is also described using only four interrupt signals INT-1 to INT-4.

While only one AND gate 76 and inverter 77 pair is shown in FIG. 12, controller 75 is in fact assumed to have four such pairs, one for each AND gate (B1 to B4) and OR gate (C1 to C4) pair; the output terminals 1–4 of the mode register 73 are separately connected to the respective AND gate 76 and inverter 77 of each pair. Furthermore, controller 17 outputs the result of comparing the contents of state register 71 with that of history register 72 on line 74, which is commonly connected to all AND gates 76.

An output terminal of mode register 73 goes high (=1) when the corresponding mode flag is set as explained above. Let us assume output terminal 1 of mode register 73 goes high. This causes inverter 77 to disable AND gate B1 for interrupt signal INT-1, so that the output of interrupt signal INT-1 is disabled by AND gate B1 until the mode flag is reset.

When controller 17 detects that the mode flag has been reset, it compares the contents of state register 71 with that of history register 72 and sets line 74 high if the contents differ. At this stage mode register 73 is not cleared and output terminal 1 stays high. As a result, the inputs of the AND gate 76 connected to output terminal 1 of mode register 73 meet the AND true condition. As a result, one input to OR gate C1 corresponding to the output terminal of the mode register 73 goes high, and interrupt signal INT-1 is output. The controller 17 can then either clear the mode flag 1 in mode register 73 or the mode register 73 can hold the mode flag. If the comparison of registers 71 and 72 detects a match, mode register 73 is cleared. Incidentally, if a signal formatter as mentioned above is to be used with this embodiment it could be arranged to be in between signal distributer 16 and controller 75 or, more preferably, it could be arranged to follow controller 75.

Embodiments of the interrupt detectors 20 in the interrupt signal generating device 10 according to the present invention are described below. Although each of the embodiments of the interrupt handler 15 described above can be combined with each of the embodiments of the interrupt detectors to be described below, the following description uses the interrupt handler 15 shown in FIG. 6 as an example.

Figure 13:
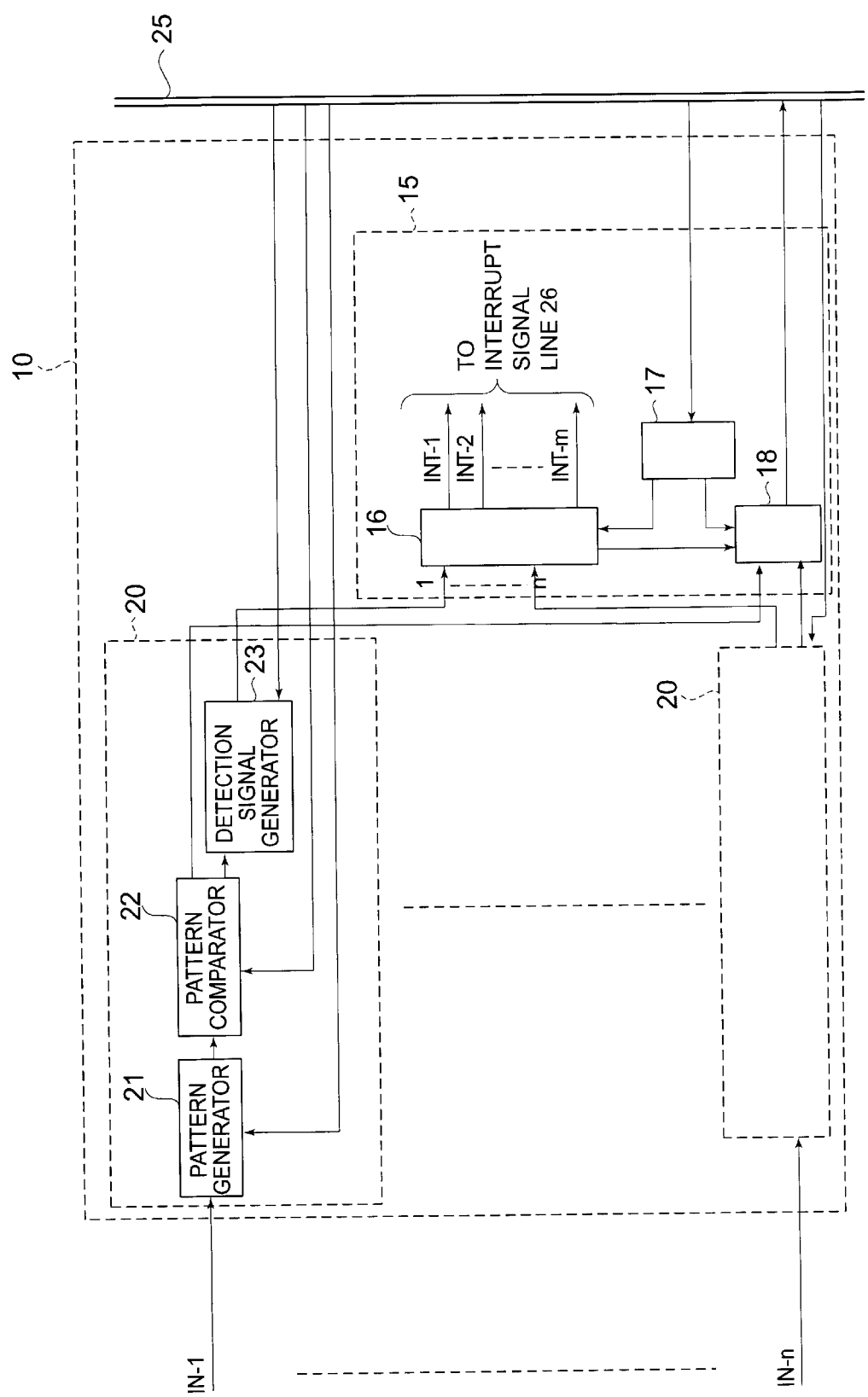
FIG. 13 is a function block diagram showing an embodiment of an interrupt detector applicable to the present invention.

FIG. 13 is a function block diagram showing a first embodiment of an interrupt detector 20 for use in a interrupt signal generating device 10 according to the present invention. The interrupt signal generating device 10 has a total n interrupt detectors 20 corresponding to n input signals IN-1 to IN-n. FIG. 13 shows the internal configuration of only one of the interrupt detectors 20, namely that for input signal IN-1, because each of the n interrupt detectors 20 can have the same structure. A case where individual ones of the n interrupt detectors may have different structures is explained later.

In this first embodiment, the interrupt detector 20 has a pattern generator 21, a pattern comparator 22, and a detection signal generator 23. The pattern generator 21 generates a specific signal pattern from the input signal as will be explained in more detail later. Signal pattern generation by the pattern generator 21 is controlled according to conditions set by the CPU by way of bus line 25. The signal pattern generated by pattern generator 21 is output to pattern comparator 22.

Pattern comparator 22 compares the signal pattern received from the pattern generator 21 with a reference pattern. The data representing this reference pattern is sent from the CPU 1 by way of bus line 25. If the pattern comparison detects a match between the signal pattern and the reference pattern, a match signal is output to both detection signal generator 23 and state memory register 18. As will be explained in more detail later, this pattern comparison may be regarded as a kind of filtering whose main purpose is to pass relevant input signals as detection signals but to block irrelevant input signals such as noise. In the absence of this filtering operation, noise could be mistaken for an input signal. Thus, a match signal is an input signal that has passed the filter operation of pattern comparator 21.

The state memory register 18 stores for each of the n interrupt detectors a respective flag (a bit) that is set in response to the match signal. The CPU 1 can identify the interrupt event and confirm the apparatus status, such as what error occurred, by reading the contents of this state memory register 18 in the routine performed after the interrupt occurs.

Detection signal generator 23 checks whether to send a detection signal to the interrupt handler 15 when it receives a match signal. More specifically, the detection signal is not output immediately when a match signal is received, but is output only when specific conditions are met. The intention is to have the sleep mode, if any, continue even when a match signal is received for any of the input signals IN-1 to IN-n, unless other conditions are also met. When no detection signal is output, no interrupt signal is applied to CPU 1, but the fact of the match signal having been output is stored in state memory register 18. It is therefore possible for CPU 1 to confirm, when a subsequent interrupt occurs, that there is an unprocessed match signal and to perform a process appropriate to the error. The conditions under which interrupt detector 20 generates a detection signal in response to a match signal can be set by CPU 1 via bus line 25 and can be freely determined in accordance with the design concept of the particular electronic apparatus.

As described above, the CPU 1 can thus freely set the conditions for generating a signal pattern from an input signal, set the reference pattern, and set the conditions for generating a detection signal. It is therefore possible to accomplish an interrupt process that is appropriate with respect to complicated conditions and differences in the time scale of state changes according to the diverse actual operating environments in which the apparatus may be used.

Figure 14:
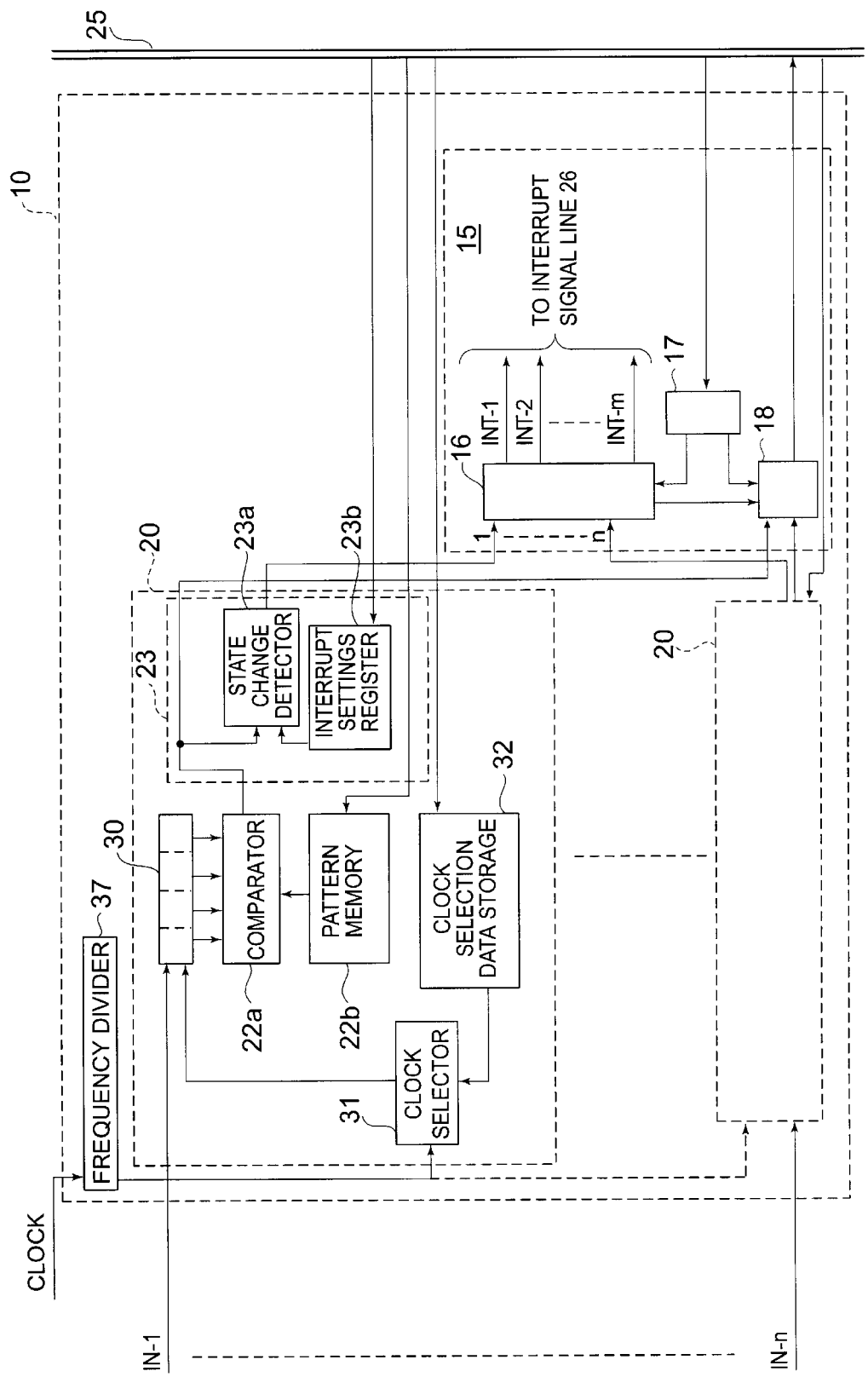
FIG. 14 is a more detailed function block diagram of the interrupt detector in FIG. 13.

FIG. 14 shows a more detailed example of this first embodiment of the interrupt detector 20 and will be used to explain one way of pattern generation and comparison. As shown in FIG. 14, pattern generator 21 of FIG. 13 can be implemented as a clock selector 31 and a shift register 30. The pattern comparator 22 of FIG. 13 is implemented in FIG. 14 as a a comparator 22a and a pattern memory 22b used for storing the reference pattern. Detection signal generator 23 includes a state change detector 23a and an interrupt settings register 23b.

A frequency divider 37 frequency-divides an input clock into plural clocks of different frequencies that are input to clock selector 31, which selects one of the applied clocks based on output from a clock selection data storage 32. By thus selecting a particular clock from among plural clocks, the clock frequency appropriate to an event to be detected can be used to generate a signal pattern. Different clocks may be selected for different ones of the n interrupt detectors 20.

Which clock, i.e. which frequency, is used is preset by CPU 1 in clock selection data storage 32, and can be changed as necessary by CPU 1. Furthermore, frequency divider 37 can be disposed externally to interrupt detectors 20 so that the plural clocks can be supplied to all interrupt detectors 20 by providing one frequency divider 37 common to input signals IN-1 to IN-n.

Input signal IN-1 is applied to shift register 30, which is clocked by the clock selected as explained above. The input stage of shift register 30 samples input signal IN-1 and the contents of the whole shift register is sequentially shifted with each clock pulse. Although a 4-stage shift register is shown in FIG. 14, more or fewer stages can be used as needed. The output signals from all the shift register stages are output as a signal pattern to comparator 22a.

Comparator 22a compares the reference pattern previously stored in the pattern memory 22b with the signal pattern output from shift register 30, and outputs a match signal to state memory register 18 and detection signal generator 23 when a match is detected. The state change detector 23a outputs a detection signal when conditions stored in interrupt settings register 23b are met. CPU 1 controls storing these conditions to interrupt settings register 23b by way of bus line 25.

Figure 15:
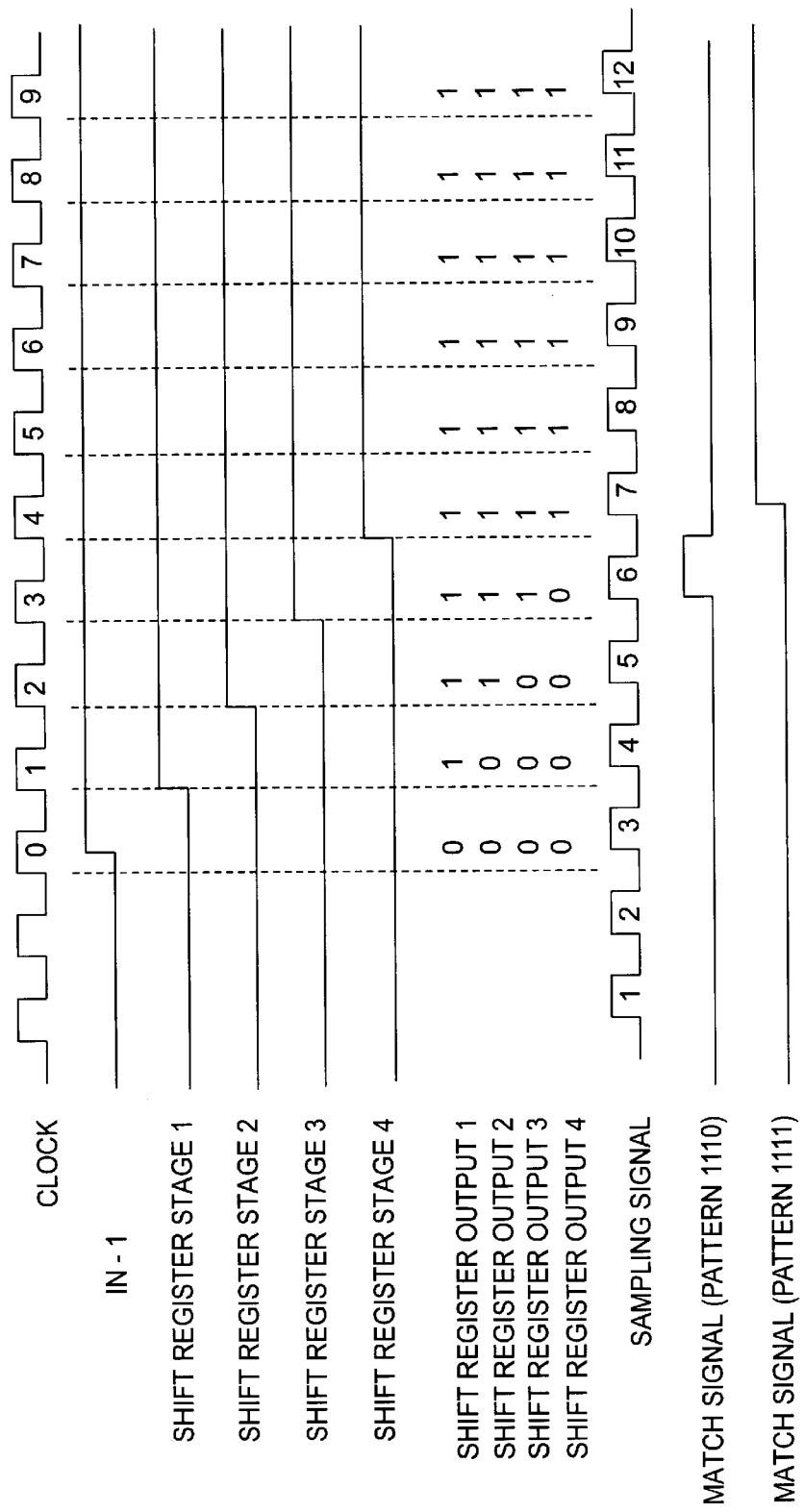
FIG. 15 is a timing chart showing the relationship between a clock, an input signal, and a match signal in the interrupt detector 20 of FIG. 13.

FIG. 15 is a timing chart showing the (selected) clock, input signal IN-1, the output signals of the four shift register stages and the match signal. Note that the reference pattern stored in this example is 1110.

Let us assume that input signal IN-1 goes high at the timing shown in FIG. 15, i.e., within the pulse width of a clock pulse numbered 0. Note further, that the shift register 30 is supposed to be edge triggered and thus sequentially shifts its contents at each rising edge of the clock. Because input signal IN-1 is low at the rising edge of clock pulse 0, shift register 30 cannot detect a change in the input signal. Shift register 30 therefore outputs 0000 at this time.

Stage 1 of shift register 30 goes high at the rising edge of clock pulse 1, the next clock pulse, because input signal IN-1 is still high. The signal pattern output by shift register 30 is therefore 1000 at this time.

Input signal IN-1 is high at the rising edge of clock pulse 2, stage 1 therefore remains high and stage 2 goes high resulting in a signal pattern 1100.

In the same way, shift register 30 outputs signal pattern 1110 at clock pulse 3. This signal pattern matches the reference pattern 1110, and the match signal therefore goes high at the timing of a sampling signal also shown in FIG. 15.

Shift register 30 outputs signal pattern 1111 at clock pulse 4. This does not match the reference pattern 1110, and the match signal output therefore stops, i.e. goes low. This configuration achieves the following benefits.

First, improper operation as a result of noise can be prevented because a match signal is not output unless there is no signal input for a specific continuous period of time. Furthermore, when a match signal is output only when there is a match with the reference pattern 1110 (or another reference pattern different from 1111), the match signal is output only for as long as there is a pattern match even if the input signal is actuated for an extended period, and a continuous interrupt signal output can thus be prevented.

It is also possible, however, to continue outputting a match signal even if a match is no longer detected, when it is desirable to control interrupt signal generation under other conditions. This may be achieved by storing the match signal from comparator 22a in a latch, flip-flop or other device in the detection signal generator 23 and using the output signal from that device as the match signal.

Alternatively, the match signal can be held by setting the reference pattern to 1111. In this case, match signal output continues for as long as the respective input signal is high once all shift register stages went high as shown in the bottom row in FIG. 15. When the reference pattern is set to 1111 and the match signal is output continuously, match signal output stops automatically when the respective input signal IN-1 is no longer present (is low). This configuration thus provides the additional benefit of not requiring a reset operation such as would be required when a latch or similar device is used as noted above.

The pattern match detection explained above can also be used to let the host 50 cause the CPU 1 to change from a sleep mode to the normal operating mode. This is further described with reference to FIG. 16 showing a function block diagram of the related configuration.

Figure 16:
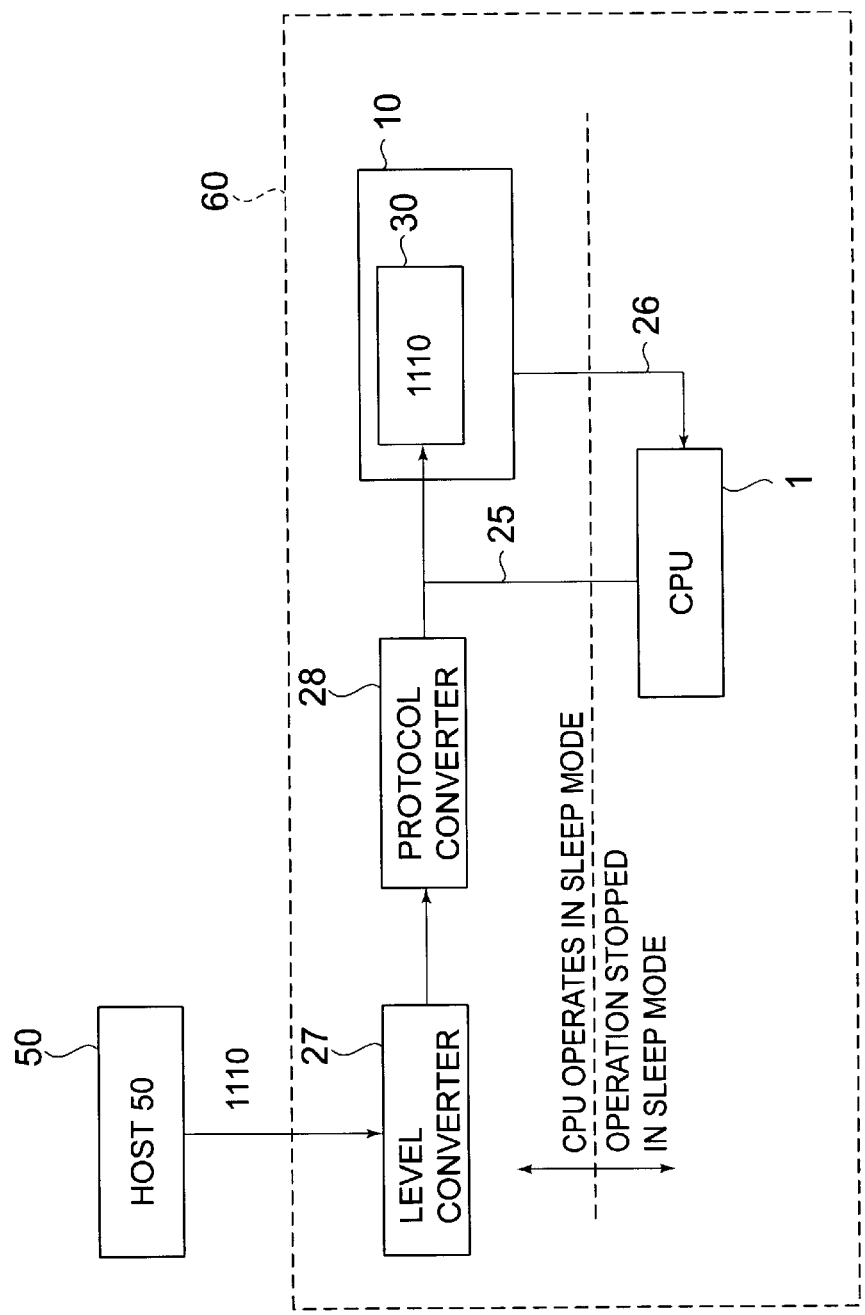
FIG. 16 is a function block diagram used to describe changing a printer or similar communication terminal 60 from a sleep mode to a normal operating mode using an interrupt signal generating device according to the present invention.

FIG. 16 shows host 50 and a communication terminal 60 (such as the printer of FIG. 2) connected to it. This communication terminal 60 has an interrupt signal generating device 10 according to the present invention including n interrupt detectors 20, not shown, as described above. One of these n interrupt detectors has the structure as shown in FIG. 14 and is reserved for use by the host to wake up the CPU. Different from the remaining n-1 interrupt detectors, this one does not receive an input signal from any sensor or detector. The remaining n-1 interrupt detectors may but need not necessarily have the structure of FIG. 14. To simplify and make it easier to understand the essential points of the following explanation, the detailed configuration of communication terminal 60 is not shown in FIG. 16. Note, further, that 1110 is stored as reference pattern in the pattern memory 22b of the interrupt detector 20.

When host 50 wants to change CPU 1 of communication terminal 60 to the normal operating mode, host 50 sends a 1110 bit pattern to communication terminal 60. Level converter 27, protocol converter 28 and interrupt signal generating device 10 of communication terminal 60 continue operating even when CPU 1 is in the sleep mode. The 1110 bit pattern sent from host 50 is therefore received, passed through level converter 27 and protocol converter 28, and input into shift register 30 of interrupt detector 20.

Because a reference pattern 1110 is stored in pattern memory 22b, a match signal is output from the comparator 22a. As a result, detection signal generator 23 outputs a detection signal to interrupt handler 15. Based on this detection signal, interrupt handler 15 generates an interrupt signal and sends it to the corresponding interrupt port of CPU 1. The interrupt signal then causes CPU 1 to change from the sleep mode to an operating mode. The CPU 1 having returned to the normal operating mode reads the state memory 18 and will learn from the information found therein that not any critical error occurred but the host 50 is asking for attention.

It will be understood by those skilled in the art that various means can be used to write the 1110 bit pattern from host 50 to shift register 30. Typical methods use a serial interface or a parallel interface. Using a serial interface is described first. The received data is output from protocol converter 28 as serial data, synchronized to a specific clock, to shift register 30 and entered into the shift register 30 with the register's shift clock as applied by clock selector 31.

Clock selector 31 selects, as the shift clock, a clock that is synchronized to the serial data synchronization clock (not shown in the figure). If a parallel interface is used, the received data 1110, for example, can be directly input to the shift register 30 as parallel data.

Figure 17:
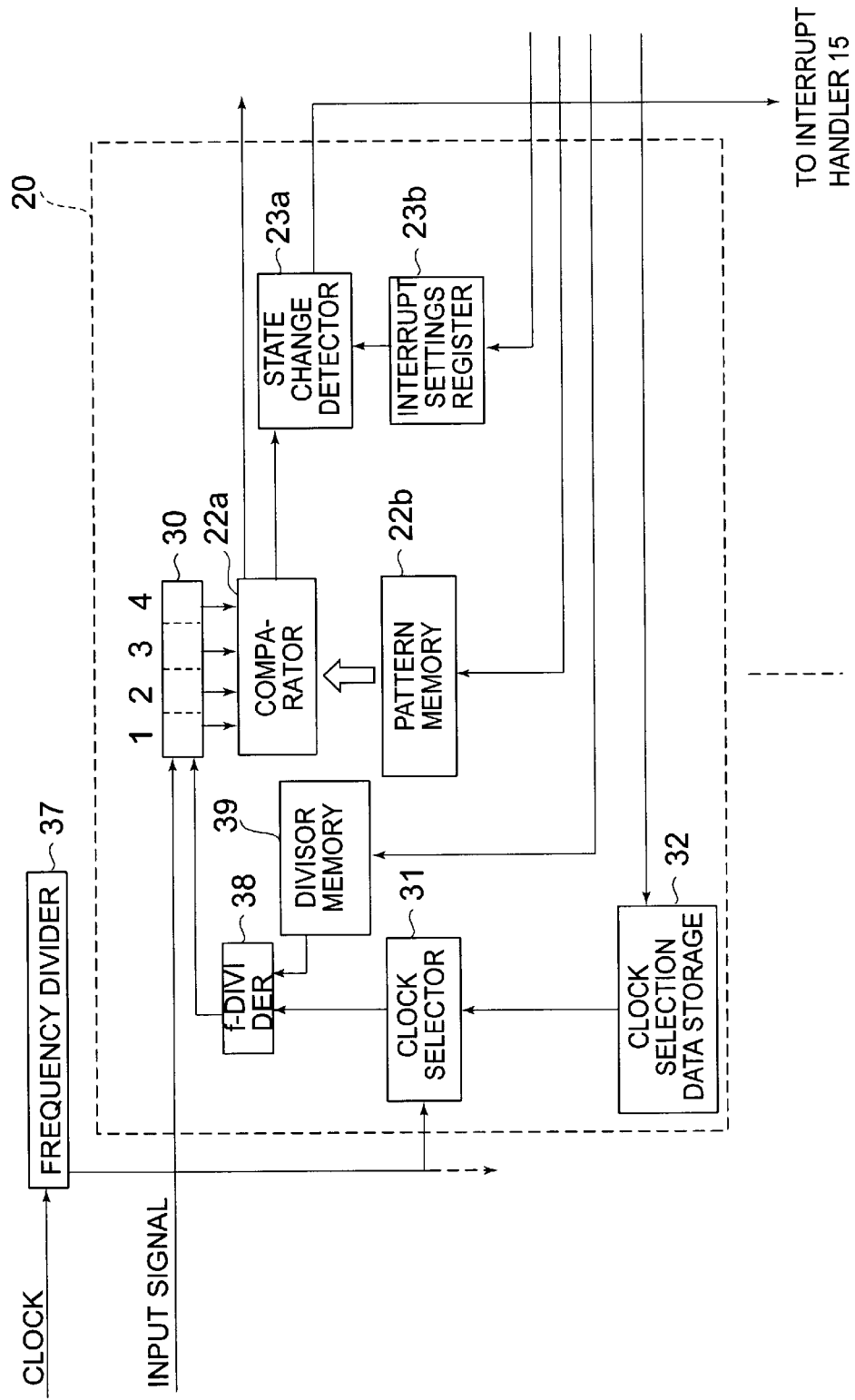
FIG. 17 is a function block diagram of a second embodiment of an interrupt detector applicable to the present invention.

A second embodiment of an interrupt detector for a device according to the present invention is described next with reference to FIG. 17. FIG. 17 is a function block diagram of an interrupt detector 20 according to this embodiment.

The difference between the interrupt detector shown in FIG. 17 and that shown in FIG. 15 is that the former has a presettable frequency divider 38 between clock selector 31 and shift register 30. This configuration makes it possible to reduce the frequency (increase the period) of the clock input to the shift register 30 by any desired factor 1/N. The value of N (being an integer) is stored in a divisor memory 39 and is preset into the frequency divider 38. The CPU 1 can set and change the value N stored in divisor memory 39 as required. The frequency divider 38 is provided in addition to the frequency divider 37 to increase the flexibility regarding the available shift clock frequencies. Cases where such increased flexibility is useful will be explained in the context of the next embodiment.

Figure 18:
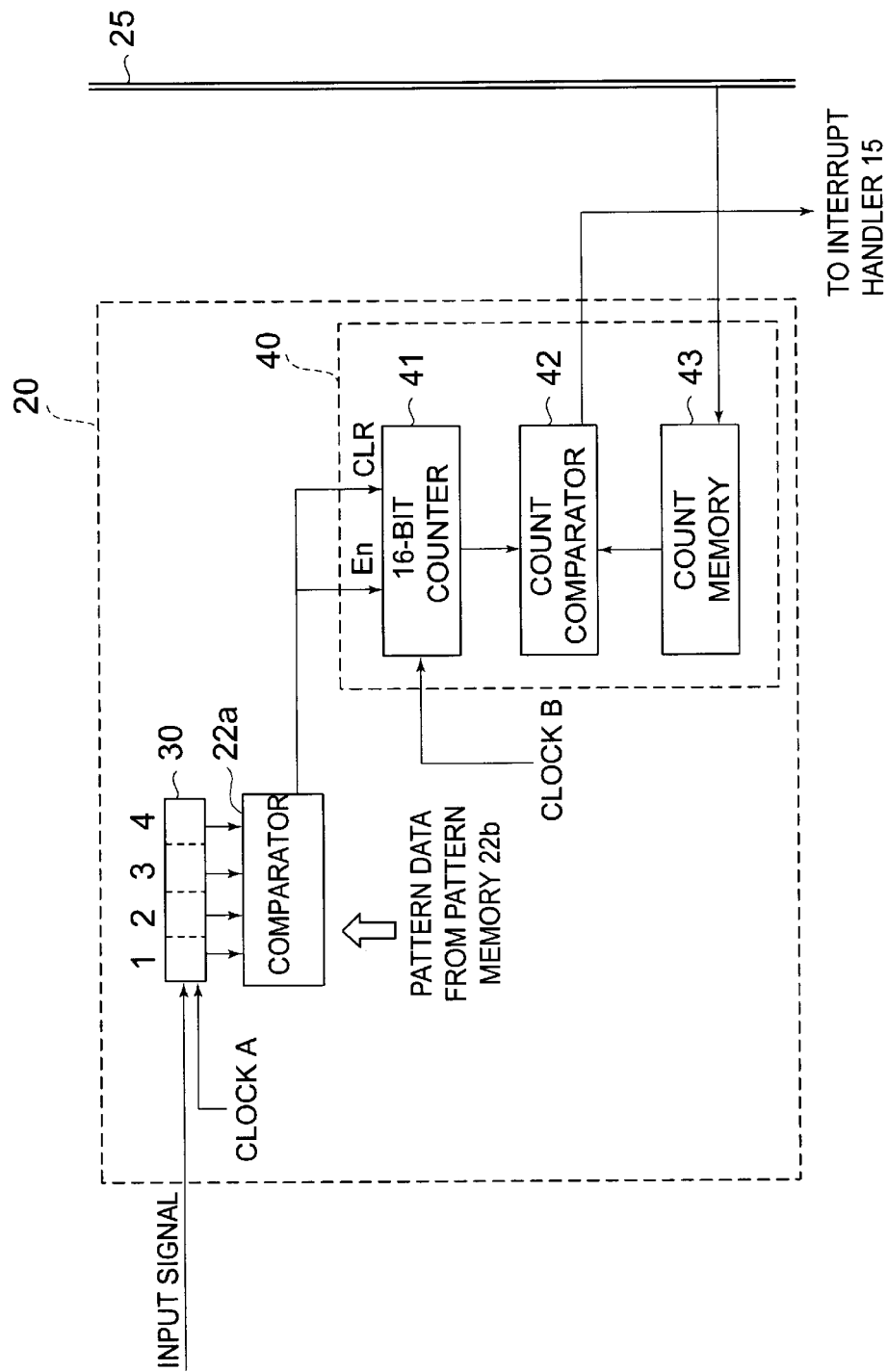
FIG. 18 is a partial function block diagram to explain a third embodiment of an interrupt detector applicable to the present invention.

A third embodiment of an interrupt detector for use in an interrupt signal generating device 10 according to the present invention is described next with reference to FIG. 18. FIG. 18 is a function block diagram of an interrupt detector 20 which can be viewed as a modification of the first or the second embodiment. It will be noted that parts of this interrupt detector 20 not shown in FIG. 18 are the same as corresponding parts in the previously described embodiments. This interrupt detector 20 adds to the previous embodiments a match count unit 40 including a 16-bit counter 41, a count comparator 42, and a count memory 43.

In this embodiment the match signal from comparator 22a is input to the enable terminal En and clear terminal CLR of counter 41. Counting thus continues for as long as the match signal is output, but the counter is reset when the match signal disappears and resumes counting when the next match signal is output. This configuration is effective when it is required to determine if the match signal is continuously output for an extended time exceeding a threshold limit. It should be noted that while a 16-bit counter 41 is used in this embodiment, a counter using more or less than 16 bits can be used as needed.

The count comparator 42 compares the count value of counter 41 with the value preset into count memory 43 by CPU 1. If the two values match, a count match signal is output to interrupt handler 15. Based on this count match signal, interrupt handler 15 generates an interrupt signal of a specific priority, and sends the resulting interrupt signal to the respective interrupt port of CPU 1. The CPU 1 is activated when an interrupt signal is applied to its interrupt port, and thus confirms the interrupt event and runs the required appropriate process as controlled by the interrupt routine stored in ROM 8 or RAM 9.

Interrupt detector 20 according to this third embodiment is effective when an interrupt signal is generated on the condition that an input signal IN longer than a normal signal is present. The number of stages in the shift register 30 would have to be increased if the presence of a long input signal were to be detected using a clock with a relatively short period. On the other hand, input signals to the pattern generator 21 cannot be uniformly increased in length because a wide range of input signals IN is possible. For example, there could be a difference of more than 1000 times in the period of signals that must be detected as interrupt events (the period could be only 20 μs in a short signal, and 20 ms or longer in a long signal).

If the length of input signals to be detected can be as long as 1000 times the shortest detected signal, it is not only impractical for frequency divider 37 to generate clocks of each corresponding frequency, it is also not possible to generate accurate signal patterns. The shift register 30 samples the input signal at the rising edge (which could alternatively be the falling edge) of the shift clock. Therefore, if an input signal disappears during one shift clock period but is present again at the next rising edge, the input signal is sequentially shifted as though nothing had happened, and the input signal change cannot be detected.

The possibility that such problems occur increases as the period of the shift clock becomes longer, and it is therefore not desirable for the shift clock period to be very long. This also applies when the clock period is increased by frequency divider 38 in the interrupt detector 20. If a shift clock with a short period is used to avoid such problems, the shift register 30 of pattern generator 21 needs an extremely large number of shift stages in order to generate the signal pattern for a long input signal.

Different types of interrupt detectors 20 can be used for input signals of different lengths. For example, an interrupt detector according to the first or second embodiment is used for interrupt detection of input signals of a typical common length, and an interrupt detector according to the third embodiment is used for interrupt detection of input signals particularly longer than these other input signals.

The detection signal output timing of the interrupt detector 20 shown in FIG. 18 is described next with reference to the timing chart in FIG. 19.

Figure 19:
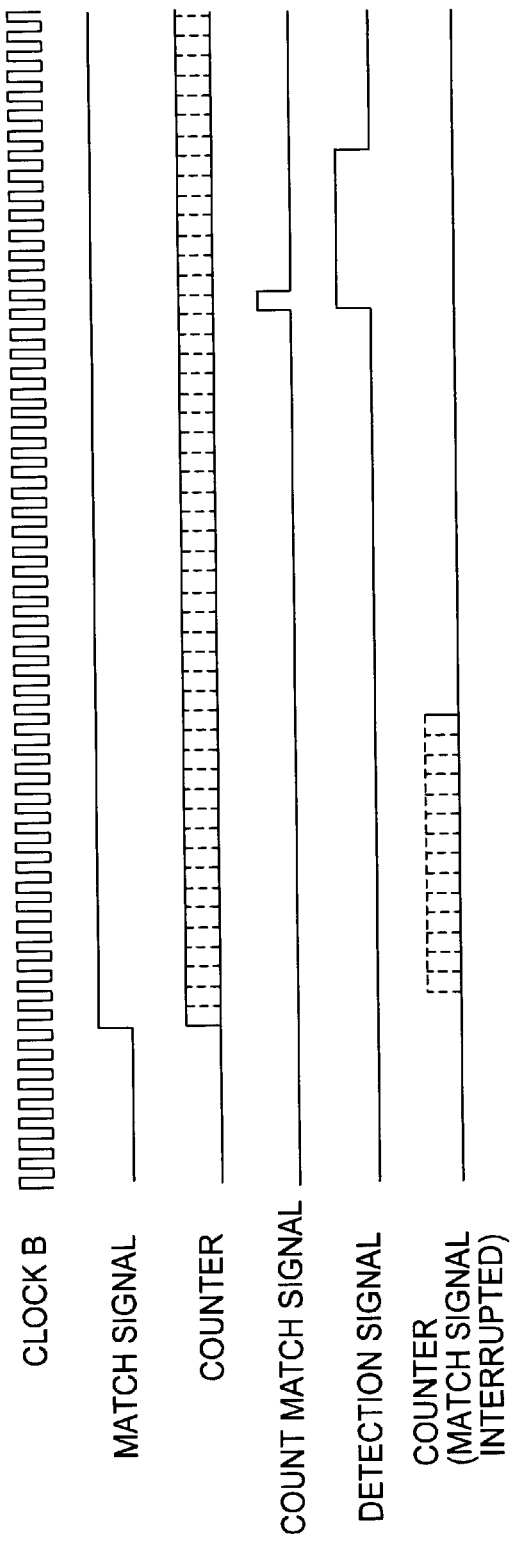
FIG. 19 is a timing chart for use in explaining the operation of the interrupt detector shown in FIG. 18.

In this example 16-bit counter 41 counts clock pulses of a clock B shown in the uppermost row in FIG. 19. The period of this clock is typically longer than that of the clock A applied to shift register 30 in order to detect particularly long input signals. When the match signal goes from low to high, enable terminal En of counter 41 goes high and counting begins. When counter 41 reaches a count equal to the count stored in count memory 43, a count match signal is output. This count match signal can be applied to detection signal generator 23 instead of the match signal from comparator 22a, or it can be directly used as a detection signal.

The counter 41 is cleared (bottom row in FIG. 19) and no count match signal is output if comparator stops outputting the match signal before the counter 41 has counted the stored count value (indicated by dotted lines). A detection signal is therefore not output, and an interrupt does not occur when the match signal from comparator 22a is shorter than the period required for counter 41 to reach the count value stored in count memory 43.

What is claimed is:

1. An interrupt signal generating device comprising:
   a plurality of interrupt detection units, each receiving a respective interrupt event signal and outputting a corresponding detection signal in response to receiving its respective interrupt event signal; and
   an interrupt handler unit having:
   a plurality of input terminals corresponding to said plurality of interrupt detection units, each input terminal being coupled to receive the detection signal from its corresponding interrupt detection unit;
   a plurality of output terminals having a one-to-one association with said plurality of input terminals, each output terminal being effective for outputting an interrupt signal to said CPU in response to its associated input terminal receiving a detection signal; and a signal distributor for associating said input terminals to said output terminals by establishing a predetermined and changeable one-to-one assignment between the input and output terminals.

2. The device of claim 1, wherein the interrupt handler unit has a control terminal and a controller responsive to a control signal applied to said control terminal for changing said assignment between the input and output terminals.

3. The device of claim 1, wherein the interrupt detection units include a detection unit for detecting a wake-up event for said CPU in a sleep mode and for outputting a corresponding detection signal.

4. The device of claim 2, wherein said assignment between the input and output terminals can be changed at any time even when the device monitored for an interrupt event is operating.

5. The device of claim 1, wherein during the handling of a current interrupt event, at least one other interrupt event to which the CPU will not respond during the handling of the current interrupt event is identified, and the one-to-one association of said plurality of input and output terminals are re-assigned so as to assign said at least one other interrupt event a lower priority.

6. An interrupt signal generating device comprising:

a plurality of interrupt detection units, each receiving a respective interrupt event signal and outputting a corresponding detection signal in response to receiving its respective interrupt event signal; and an interrupt handler unit having:
a plurality of input terminals corresponding to said plurality of interrupt detection units, each input terminal being coupled to receive the detection signal from its corresponding interrupt detection unit;
a plurality of output terminals for outputting corresponding interrupt signals to a CPU;
a signal distributor for coupling said input terminals to said output terminals by establishing a predetermined and changeable assignment between the input and output terminals, wherein the number of input terminals is larger than the number of output terminals and said signal distributor groups at least part of said input terminals into two or more groups, each group being assigned to a respective one of the output terminals, such that an interrupt signal is output from a respective output terminal in response to a detection signal applied to any one of the input terminals that belong to the associated group; and
a memory for storing information identifying the detection signals output from the interrupt detection units;
wherein the interrupt handler unit stores in the memory information identifying every detection signal received while the CPU executes a current interrupt process, and after the current interrupt process ends, outputs on a corresponding one of said output terminals an interrupt signal associated with a selected detection signal identified in the memory; and
wherein if the interrupt handler unit receives a new detection signal at an input terminal contained in the same group as a previous detection signal corresponding to a current interrupt process being executed by the CPU, then the interrupt handler stores the identity of the received new detection signal in the memory so as to distinguish it from any other detection signal also received while the CPU executes the current interrupt process but not belonging to the same group as the previous detection signal of the current interrupt process, and after the current interrupt process ends, the interrupt handler outputs to the CPU a new detection interrupt signal corresponding to said new detection signal irrespective of the interrupt priority level of said any other detection signal.

7. The device of claim 6, wherein the interrupt handler unit outputs an interrupt signal from a respective output terminal based on a logical OR condition of the plural detection signals applied to input terminals belonging to the assigned group.

8. The device of claim 6, wherein said interrupt handler unit has a control terminal and a controller responsive to a control signal applied to said control terminal for setting or changing said grouping.

9. The device of claim 6, wherein:
the memory includes a state memory and a history memory, said state memory storing information identifying every received detection signal and said history memory conditionally storing information identifying selective received detection signals;
the interrupt handler unit stores in the state memory information identifying every received detection signal and stores in the history memory information identifying only received detection signals that do not belong to the same group as the detection signal that triggered the current interrupt process, and
said interrupt handler unit further compares the contents of the state memory and the history memory after the current interrupt process ends, and if they do not match then the interrupt handler outputs an interrupt signal corresponding to a detection signal identified in the state memory but not identified in the history memory.

10. An interrupt signal generating device comprising:
a plurality of interrupt detection units, each outputting a detection signal in response to a respective input signal representing an interrupt event;
an interrupt handler unit having a plurality of input terminals for receiving the detection signals and having a plurality of output terminals for outputting corresponding interrupt signals to a CPU, said signal distributor coupling said input terminals to said output terminals and establishes a predetermined and changeable assignment between the input and output terminals, said signal distributor grouping at least part of said input terminals into two or more groups, each group being assigned to a respective one of the output terminals, such that an interrupt signal is output from a respective output terminal in response to a detection signal being applied to any one of the input terminals that belong to its assigned group; and
a state memory for storing information identifying the detection signals output from the interrupt detection units;
wherein the interrupt handler unit stores in the state memory information identifying detection signals received while the CPU executes a current interrupt process, and after the current interrupt process ends, outputs on said output terminal an interrupt signal corresponding to the detection signal identified by the information stored in the state memory; and
wherein if the interrupt handler unit receives a new detection signal at an input terminal contained in the same group as a previous detection signal corresponding to a current interrupt process being executed by the CPU, the interrupt handler stores the identity of the received new detection signal in the state memory so as to distinguish it from any other detection signal also received while the CPU executes the current interrupt process but not belonging to the same group as the previous detection signal of the current interrupt process, and after the current interrupt process ends, the interrupt handler outputs to the CPU a new detection interrupt signal corresponding to said new detection signal irrespective of the interrupt priority level of said any other detection signal.

11. The device of claim 10, wherein the interrupt handler unit outputs interrupt signals while the CPU is executing the current interrupt process.

12. The device of claim 10, wherein:

the state memory includes a state register and a history register, said state register stores information identifying every received detection signal and said history register conditionally stores information identifying selective received detection signals;

wherein the interrupt handler unit stores in the state register information identifying every received detection signal and stores in the history register information identifying only received detection signals that do not belong to the same group as the detection signal that triggered the current interrupt process, and wherein said interrupt handler unit further compares the contents of the state register and the history register after the current interrupt process ends, and if they do not match then the interrupt handler outputs an interrupt signal corresponding to a detection signal identified in the state register but not identified in the history register.

13. A method of generating interrupt signals and applying the interrupt signals to a CPU, said method comprising the steps of:

(a) monitoring a plurality of input terminals for the occurrence of detection signals representing interrupt events;

(b) assigning each input terminal to at least two groups and associating each group to any one of a plurality of output terminals; and (c) outputting an interrupt signal from a corresponding one of the output terminals, when step (a) detects a detection signal at an input terminal assigned to the group associated with that output terminal;

(f) monitoring said plurality of input terminals for the occurrence of subsequent detection signals after an interrupt signal has been output and while the CPU executes a first interrupt process corresponding to that outputted interrupt signal;

(g) storing all subsequent detection signals detected in step (f), identifying all subsequent detection signals that belong to the same group as that outputted interrupt signal corresponding to said first interrupt process and identifying all subsequent detection signals that do not belong to the same group as that interrupted signal corresponding to said first interrupt process;

(h1) confirming when said first interrupt process ends if any subsequent detection signals were stored in step (g);

(h2) if step (h1) confirms that subsequent detection signals were stored in step (g), then outputting a interrupt signal corresponding to a confirmed subsequent detection signal identified as belonging to said same group irrespective of the priority level of any subsequent detection signal identified as not belonging to said same group, otherwise outputting an interrupt signal corresponding to the highest priority subsequent detection signal that identified as not belonging to said same group;

(i) if step (h1) confirms no subsequent detection signals, ten returning to step (a), otherwise repeating steps (f) (g), (h1) and (h2).

14. The method of claim 13, further comprising the steps of (d) receiving an assignment changing request; and (e) changing the assignment between said input and output terminals in response to a request received in step (d).

15. The method of claim 14, wherein step (e) includes:

(e1) changing the assignment between the groups and the output terminals in response to a request received in step (d).

16. The method of claim 13, wherein:

step (g) includes storing in a state memory, information identifying every received detection signal and storing in a history memory information identifying only received detection signals that do not belong to the same group as the detection signal that triggered the current interrupt process; and step (h1) includes comparing the contents of the state memory and the history memory after the current interrupt process ends.

17. A printer comprising:

a print mechanism;

a CPU coupled to said print mechanism;

a plurality of interrupt detection units, each outputting a detection signal in response to a respective input signal representing an interrupt event; and an interrupt handler unit coupled to said plurality of interrupt detection units and to said CPU, the interrupt handler having:

a plurality of input terminals corresponding to said plurality of interrupt detection units, each input terminal being coupled to receive the detection signal from its corresponding interrupt detection unit;

a plurality of output terminals having a one-to-one association with said plurality of input terminals, each output terminal being effective for outputting an interrupt signal to the CPU in response to its associated input terminal receiving a detection signal; and a signal distributor for associating said input terminals to said output terminals by establishing a predetermined and changeable one-to-one assignment between the input and output terminals.

18. The printer of claim 17, wherein during the handling of a current interrupt event, at least one other interrupt event to which the CPU will not respond during the handling of the current interrupt event is identified, and the one-to-one association of said plurality of input and output terminals are re-assigned so as to assign said at least one other interrupt event a lower priority.

19. A printer comprising:

a print mechanism;

a CPU coupled to said print mechanism;

a plurality of interrupt detection units, each outputting a detection signal in response a respective input signal representing an interrupt event;

an interrupt handler unit having a plurality of input terminals for receiving the detection signals and having a plurality of output terminals for outputting corresponding interrupt signals to the CPU, said signal distributor coupling said input terminals to said output terminals and establishes a predetermined and changeable assignment between the input and output terminals, said signal distributor grouping at least part of said input terminals into two or more groups, each group being assigned to a respective one of the output terminals, such that an interrupt signal is output from a respective output terminal in response to a detection signal being applied to any one of the input terminals that belong to its assigned group; and a state memory for storing information identifying the detection signals output from the interrupt detection units;

wherein the interrupt handler unit stores in the state memory information identifying detection signals received while the CPU executes a current interrupt process, and after the current interrupt process ends, outputs on said output terminal an interrupt signal corresponding to the detection signal identified by the identifying information stored in the state memory; and wherein if the interrupt handler unit receives a new detection signal at an input terminal contained in the same group as a previous detection signal corresponding to a current interrupt process being executed by the CPU, the interrupt handler stores the identity of the received new detection signal in the state memory so as to distinguish it from any other detection signal also received while the CPU executes the current interrupt process but not belonging to the same group as the previous detection signal of the current interrupt process, and after the current interrupt process ends, the interrupt handler outputs to the CPU a new detection interrupt signal corresponding to said new detection signal irrespective of the interrupt priority level of said any other detection signal.

20. The printer of claim 19, wherein:

the state memory includes a state register and a history register, said state register stores information identifying every received detection signal and said history register conditionally stores information identifying selective received detection signals;

wherein the interrupt handler unit stores in the state register information identifying every received detection signal and stores in the history register information identifying only received detection signals that do not belong to the same group as the detection signal that triggered the current interrupt process, and wherein said interrupt handler unit further compares the contents of the state register and the history register after the current interrupt process ends, and if they do not match then the interrupt handler outputs an interrupt signal corresponding to a detection signal identified in the state register but not identified in the history register.

* * * * *

UNITED STATES PATENT AND TRADEMARK OFFICE
CERTIFICATE OF CORRECTION

PATENT NO. : 6,772,260 B2
DATED : August 3, 2004
INVENTOR(S) : Yuji Kawase et al.

It is certified that error appears in the above-identified patent and that said Letters Patent is hereby corrected as shown below:

Title page,
Item [56], References Cited, U.S. PATENT DOCUMENTS, insert
-- 5,530,875, 6/1996, Wach --; and
FOREIGN PATENT DOCUMENTS, insert
-- EP 9 316138, 5/1989; EP 0 943999, 9/1999 --.

Column 17,
Line 1, change "said" to -- a --.

Column 18,
Line 44, change "said" to -- a --.

Column 19,
Line 66, change "a" to -- an --.

Column 20,
Line 6, delete "that"; and
Line 9, change "ten" to -- then --.

Column 21,
Line 4, change "said" to -- a --.

Signed and Sealed this

Twenty-eighth Day of December, 2004

JON W. DUDAS
*Director of the United States Patent and Trademark Office*